US012760829B2

(12) United States Patent
Rogers et al.

(10) Patent No.: US 12,760,829 B2
(45) Date of Patent: Oct. 13, 2026

(54) REACTIVE FLUID SYSTEM ACCOUNTING FOR THERMAL EXPANSION IN REPLACEMENT OF NITROGEN WITHIN CHARGED PULSATION CONTROL EQUIPMENT

(71) Applicant: Performance Pulsation Control, Inc., Richardson, TX (US)

(72) Inventors: John Thomas Rogers, Garland, TX (US); Cersten Jantzon, Houston, TX (US); James Barlow, Dallas, TX (US)

(73) Assignee: Performance Pulsation Control, Inc., Richardson, TX (US)

( * ) Notice: Subject to any disclaimer, the term of this patent is extended or adjusted under 35 U.S.C. 154(b) by 0 days.

(21) Appl. No.: 17/151,574

(22) Filed: Jan. 18, 2021

(65) Prior Publication Data

US 2021/0222813 A1 Jul. 22, 2021

Related U.S. Application Data

(60) Provisional application No. 62/985,613, filed on Mar. 5, 2020, provisional application No. 62/961,953, filed on Jan. 16, 2020.

(51) Int. Cl.
*F16L 55/05* (2006.01)
*E21B 21/08* (2006.01)

(52) U.S. Cl.
CPC .............. *F16L 55/05* (2013.01); *E21B 21/08* (2013.01); *F15B 2201/20* (2013.01); *F15B 2201/3151* (2013.01); *F15B 2201/3152* (2013.01)

(58) Field of Classification Search
CPC .. B65D 2203/04; F15B 1/165; F15B 2201/20; F15B 2201/315;

(Continued)

(56) References Cited

U.S. PATENT DOCUMENTS 42,684 A * 5/1864 Nathaniel ............... G01F 19/00 141/331
1,718,897 A * 6/1929 Dunbar ................... G01F 19/00 222/572

(Continued)

FOREIGN PATENT DOCUMENTS

CA 2 383 869 A1 3/2001
CO 5900025 A1 3/2008

(Continued)

OTHER PUBLICATIONS

Office Action dated Sep. 28, 2022 in connection with India Patent Application No. 202227040468, 5 pages.

(Continued)

*Primary Examiner* — Kenneth Rinehart
*Assistant Examiner* — Richard K. Durden

(57) ABSTRACT

A pulsation dampener includes a quantity of liquid reactive fluid (e.g., about 20 gallons) contained within a flexible diaphragm and separated from fluid from an external pumped fluid flow. The quantity of liquid reactive fluid is selected to dampen pressure pulses within the external pumped fluid flow. The pulsation dampener is configured to accommodate thermal expansion of the quantity of liquid reactive fluid by one or more of including a quantity of compressible foam within the flexible diaphragm, allowing for a space between the flexible diaphragm when holding the quantity of the liquid reactive fluid and a body of the pulsation dampener, or providing a reset pressure relief valve.

11 Claims, 19 Drawing Sheets

(58) Field of Classification Search
CPC ...... F15B 2201/3151; F15B 2201/3152; F15B 2201/3154; F16F 9/003
USPC .................................... 73/427; 220/720, 721
See application file for complete search history.

(56) References Cited

U.S. PATENT DOCUMENTS

| | | | | | |
|---|---|---|---|---|---|
| 1,949,491 | A * | 3/1934 | Rush | F16N 13/20 222/65 |
| 2,786,488 | A * | 3/1957 | Mercier | F16K 7/10 92/92 |
| 2,904,077 | A * | 9/1959 | Trumper | F16F 9/082 220/721 |
| 2,931,392 | A * | 4/1960 | Mercier | F15B 1/10 138/30 |
| 3,061,039 | A * | 10/1962 | Peters | F16L 55/02 285/228 |
| 3,292,661 | A | 12/1966 | Everett | |
| 3,442,293 | A * | 5/1969 | Erdmann | F16L 55/052 138/30 |
| 3,455,316 | A * | 7/1969 | Rogers | F16K 17/38 236/92 R |
| 3,534,884 | A * | 10/1970 | Suter | B60K 15/03 138/30 |
| 3,881,519 | A | 5/1975 | Zahid | |
| 4,186,776 | A | 2/1980 | Burton | |
| 4,195,668 | A | 4/1980 | Lewis | |
| 4,299,253 | A | 11/1981 | Burton | |
| 4,299,254 | A * | 11/1981 | Zahid | F15B 1/20 138/30 |
| 4,305,428 | A | 12/1981 | Burton | |
| 4,367,786 | A * | 1/1983 | Hafner | F15B 1/086 165/41 |
| 4,427,029 | A | 1/1984 | Charney et al. | |
| 4,548,713 | A | 10/1985 | Schmid | |
| 4,585,400 | A | 4/1986 | Miller | |
| 4,760,865 | A * | 8/1988 | Rilett | F17C 13/04 220/86.1 |
| 5,682,923 | A * | 11/1997 | Goloff | F16L 55/053 138/30 |
| 5,868,168 | A | 2/1999 | Mott et al. | |
| 5,944,217 | A * | 8/1999 | Baena | F15B 1/086 220/551 |
| 5,965,249 | A * | 10/1999 | Sutton | F16F 13/00 428/317.9 |
| 7,004,105 | B2 * | 2/2006 | Bucksch | G01F 19/00 33/1 V |
| 8,438,921 | B1 * | 5/2013 | Bland | G01F 19/00 73/426 |
| 9,527,650 | B2 * | 12/2016 | Jordan | B65D 25/56 |
| 10,697,475 | B2 * | 6/2020 | Kloft | F15B 1/24 |
| 2004/0202401 | A1 * | 10/2004 | Berg | G01V 11/00 385/12 |
| 2010/0050622 | A1 * | 3/2010 | Stroganov | F15B 1/103 60/415 |
| 2010/0071792 | A1 | 3/2010 | Baltes et al. | |
| 2010/0243723 | A1 * | 9/2010 | Partington | G01F 19/00 229/406 |
| 2010/0314439 | A1 * | 12/2010 | Partington | G01F 19/00 220/675 |
| 2012/0155230 | A1 * | 6/2012 | Patt | G04B 37/02 368/291 |
| 2013/0000735 | A1 | 1/2013 | Blaze et al. | |
| 2014/0299609 | A1 * | 10/2014 | Baltes | F17C 1/00 220/581 |
| 2018/0038391 | A1 * | 2/2018 | Kloft | F15B 1/086 |
| 2018/0328322 | A1 | 11/2018 | Kashiwagi et al. | |
| 2024/0337519 | A1 * | 10/2024 | Lundberg | G01F 19/00 |

FOREIGN PATENT DOCUMENTS

| | | | | |
|---|---|---|---|---|
| DE | 3110153 | A1 | 5/1982 | |
| DE | 3207754 | A1 | 9/1983 | |
| DE | 4100880 | A1 * | 7/1991 | F15B 1/086 |
| FR | 1605326 | A | 8/1974 | |
| FR | 3047774 | A1 | 8/2017 | |
| FR | 3069054 | A1 * | 1/2019 | G01F 19/00 |
| GB | 1242589 | A | 8/1968 | |
| GB | 2103716 | A | 2/1983 | |

OTHER PUBLICATIONS

Notification of Transmittal of the International Search Report and the Written Opinion of the International Searching Authority, or the Declaration dated Apr. 6, 2021 in connection with International Patent Application No. PCT/US2021/13829, 9 pages.
Office Action dated Feb. 14, 2023 in connection with Eurasian Patent Application No. 202292124, 6 pages.
Office Action dated Dec. 27, 2022 in connection with Saudi Arabia Patent Application No. 520433315, 7 pages.
Office Action dated Dec. 13, 2022 in connection with Uzbekistan Patent Application No. IAP 2022 0387, 4 pages.
Office Action dated Jan. 5, 2023 in connection with Algeria Patent Application No. 220488, 2 pages.
Official Action dated Sep. 28, 2023, in connection with Eurasian Application No. 202292124, 2 pages.
Examination report dated Sep. 28, 2023, in connection with Canadian Application No. 3,168,245, 8 pages.
Office Action dated Feb. 9, 2024, in connection with Columbian Patent Application No. NC2022/0010018, 22 pages.
Supplementary European Search Report dated Dec. 19, 2023, in connection with European Patent Application No. 21740966.3, 8 pages.
Examination Report dated May 8, 2024, in connection with Kuwaiti Application No. KW/P/2022/000972, 9 pages.
Examination as to substance dated Apr. 24, 2024, in connection with Vietnamese Application No. 1-2022-05099, 4 pages.
Substantive Examination Report Notification dated Oct. 29, 2024, in connection with Saudi Arabian Application No. 522433315, 26 pages.
Official Communication dated Jun. 9, 2025, in connection with Colombian Application No. NC2022/0010018, 30 pages.
Office action dated Jun. 12, 2025, in connection with Mexican Application No. MX/a/2022/008812, 14 pages.
Communication pursuant to Article 94(3) EPC dated Jun. 17, 2025, in connection with European Application No. 21740966.3, 6 pages.
Substantive Examination Result dated Sep. 20, 2024, in connection with United Arab Emirates Patent Application No. P6001341/2022, 11 pages.
Technical Report dated Jul. 2, 2024, in connection with Egyptian Patent Application No. 2022070962, 10 pages.
Notice of Allowance dated Dec. 16, 2025, in connection with Canadian Application No. 3,168,245, 1 page.
Second Substantive Requirement dated Dec. 10, 2025, in connection with Mexican Application No. MXa2022/008812, 18 pages.
Office Action dated Apr. 29, 2026, in connection with Colombia Application No. N2022/0010018, 20 pages.
Examination Report dated May 10, 2026, in connection with Bahrain Application No. 20220207, 6 pages.
Office Action and Examination Report dated Jul. 7, 2026, in connection with United Arab Emirates Application No. P6001341/2022, 9 pages.
Office Action dated Jul. 28, 2026, in connection with Malaysian Application No. PI2022003707, 3 pages.
Office Action dated Jun. 26, 2026, in connection with Mexican Application No. MX/a/2022/008812, 6 pages.

* cited by examiner

REACTIVE FLUID SYSTEM ACCOUNTING FOR THERMAL EXPANSION IN REPLACEMENT OF NITROGEN WITHIN CHARGED PULSATION CONTROL EQUIPMENT

PRIORITY CLAIM

This application claims priority to U.S. Provisional Patent Application No. 62/961,953 filed Jan. 16, 2020 and to U.S. Provisional Patent Application No. 62/985,613 filed Mar. 5, 2020. The content of the above-identified patent documents is incorporated herein by reference.

TECHNICAL FIELD

The present application relates generally to pulsation dampeners/dampners/dampers/accumulators and, more specifically, to replacing the nitrogen within gas-charged pulsation dampeners with a reactive, compressible liquid while accounting for thermal expansion by one or more of augmenting with cellular material, a gap or less than full fill of the bladder with the reactive liquid, and a reset pressure relief valve.

BACKGROUND

In North America, the first commercial oil well entered operation in Oil Springs, Ontario in 1858, while the first offshore oil well was drilled in 1896 at the Summerland Oil Field on the California coast. Reciprocating systems, such as reciprocating pump systems and similar equipment, operate in many types of cyclic hydraulic applications. For example, reciprocating mud pump systems are used to circulate the mud or drilling fluid on a drilling rig.

As well depths and drilling efficiencies increased along came the need for highly efficient mud pumps. The early designs were rudimentary double acting duplex pumps that have since been replaced with high pressure and high horsepower single acting triplex and other single acting designs including quadruplex, quintuplex and hexuplex mud pumps.

Pressure peaks within the pumped fluid accelerate, with each pulsation, the deterioration of the pump, the pump's fluid end expendable parts, and equipment downstream from the pump, such as measurement equipment used to determine drilling parameters, and wash pipe and wash pipe packing. Failure to control such pressure peaks inevitably affect the operating performance and operational life of the pump, pump fluid end expendable parts and all upstream or downstream components. Pressure peaks may also interfere with instrument signal detection, such that failure to control pressure peaks may also affect the signal detection and/or quality of the signal detection in (for example) measurement while drilling operations.

Thus, with increased pressure and pump horsepower came the need to reduce pulsations from the pump in order to maintain drilling efficiencies. In the early 1940's, nitrogen gas charged pulsation dampeners were introduced beginning with 5, then 10 and now 20 gallon units. As drilling efficiencies are paramount, the need to have pulsation dampeners effectively reduce the level of pulsation energies and their potential interaction with system natural frequencies are becoming more critical. The interaction of the pump primary pulsation frequencies with those of the system sets up potentially harmful and destructive forces (vibrations) resulting in early fatigue failure of mud pump expendables, mud line equipment, Kelly and kicker hoses, top drive wash pipe packing and significant interference with managed pressure drilling (MPD), measurement while drilling (MWD), or logging while drilling (LWD) exploration and production activities.

Pulsation control equipment is typically placed immediately upstream or downstream from a reciprocating pump, often with a relative size and configuration proportional to the volume of desired fluid displacement per stroke of the pump and the maximum allotted magnitude of the pressure peaks that may be experienced by the pump system during each pulsation. Pulsation control equipment thus aids in reducing pump loads and minimizing pulsation amplitudes to the pump, the pump's fluid end expendable parts and to equipment upstream or downstream. As a result, pulsation control equipment increases the relative operating performance and life of the pump, the pump's fluid end expendable parts and any equipment upstream or downstream from the pump. In addition, drilling efficiency using MPD/MWD/LWD systems is impacted as discussed above.

Employing conventional gas charged dampener (or, equivalently for purposes of this disclosure, "dampener", "damper," "accumulator," or "pulsation control equipment") generally involves a pressure containment vessel in cylindrical, spherical, torospherical or similar shape in which resides a bladder (or, equivalently for purposes of this disclosure, "diaphragm" or "bellows") that contains a nitrogen gas pre-charge. This conventional design has been adapted for use in drilling and all other industrial markets of positive displacement reciprocating piston/plunger pumps.

For gas-charged pulsation dampeners, the challenge has always been to establish the correct pre-charge on the bladder against expected system operating conditions. In steady-state operating conditions with established pre-charge, the system performance is acceptable. However, in contemporary MPD/MWD/LWD processes, where micro-process corrections are made continuously and system pressures fluctuating widely, the dampener performance and the service life of the bladder is reduced. As pre-charge on the dampener bladder can only be established against zero operating pressure, the system needs to be shut down such that productivity is curtailed when making changes to the dampener precharge. Once the calculated pre-charge is established, the bladder may fail when the system pressure varies outside the safe operating limits, or may fail to perform as desired when the system pressure varies outside the expected operating range.

Further, continuous adjustment of the pre-charge needs to be made during the service life of the bladder to ensure long and acceptable performance. A few regenerative systems, as yet highly impractical, have been tried.

In the absence of other solutions, a liquid-only, bladderless (maintenance free) dampener has entered the market, but occupies a large space and/or has a large footprint since the performance (based purely on liquid compressibility) requires a large liquid volume to achieve acceptable pulsation control. The designs are more effective at higher system pressures and may achieve good pulsation control across all applications where system pressures fluctuate beyond what conventional pulsation dampeners are designed to handle, but the space trade-off needs to be considered.

SUMMARY

A pulsation dampener includes a quantity of liquid reactive fluid (e.g., about 20 gallons) contained within a flexible diaphragm and separated from external pumped fluid flow by the flexible diaphragm. The liquid quantity of reactive fluid is selected to dampen pressure pulses within the external pumped fluid flow. The pulsation dampener is configured to accommodate thermal expansion of the quantity of liquid reactive fluid by one or more of including a quantity of compressible foam within the flexible diaphragm, allowing for a space between the flexible diaphragm when holding the quantity of the liquid reactive fluid and a body of the pulsation dampener, or providing a reset pressure relief valve Before undertaking the DETAILED DESCRIPTION below, it may be advantageous to set forth definitions of certain words and phrases used throughout this patent document: the terms “include” and “comprise,” as well as derivatives thereof, mean inclusion without limitation; the term “or,” is inclusive, meaning and/or; and the phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9B, discussed below, and the various embodiments used to describe the principles of the present disclosure in this patent document are by way of illustration only and should not be construed in any way to limit the scope of the disclosure. Those skilled in the art will understand that the principles of the present disclosure may be also implemented in any suitably arranged standpipe manifold dampener or system dampener that can be used to control or partially control pulsation amplitudes as well as other types of gas charged pulsation control products The present disclosure utilizes reactive, compressible fluid to replace the compressible gas medium in conventional pulsation dampeners. Suitable compressible fluids of the type contemplated in this application are known in the art.

Figure 1:
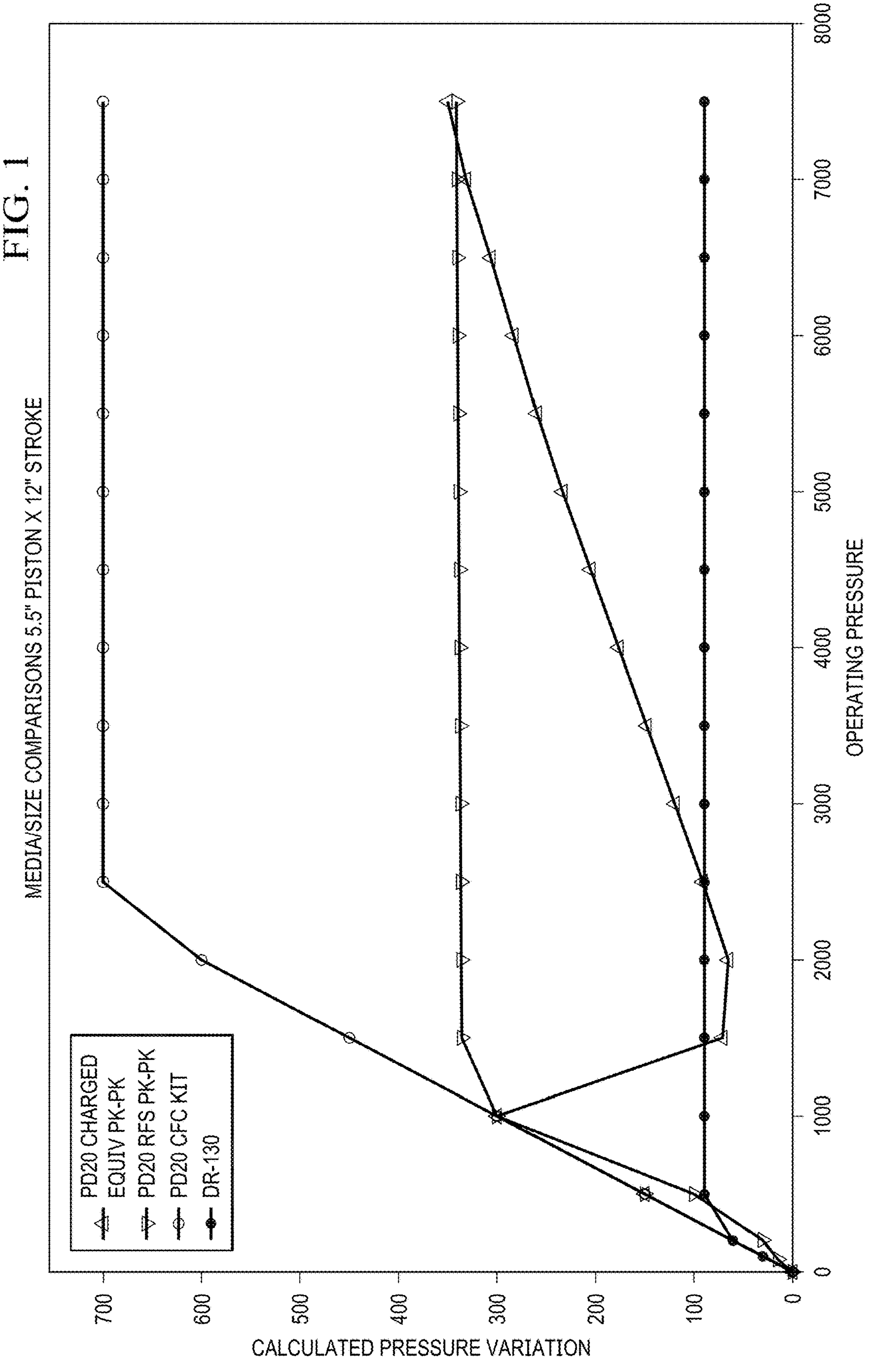
FIG. 1 is a plot of comparative estimated pulsation levels across a range of operating pressures within a mud pump system using various types of pulsation dampeners, including a pulsation dampener with a diaphragm filled or partially filled with reactive fluid according to various embodiments of the present disclosure.

The use of reactive fluid in pulsation control in accordance with the present disclosure is designed to limit pulsations to acceptable levels. FIG. 1 illustrates estimated pressure variations graphically for operation across the range of 0 to 7,500 pounds per square inch (psi). In typical drilling applications, following are the expected pulsation limits in pounds per square in gauge (psig) of the various systems that might be used within a system employing a typical, 5.5"×12" single acting triplex mud pump:

| System Employed | Estimated Pulsation Levels (psig, peak-to-peak) |
|---|---|
| 20 gallon conventional dampener, charge-free kit (“PD20 CFC Kit” in the legend of FIG. 1) | 700 |
| 20 gallon conventional dampener, nitrogen filled (“PD-20 Charged Equiv PK-PK” in the legend of FIG. 1) | Variable to 350 |
| 20 gallon conventional dampener, reactive fluid filled (“PD20 RFS PK-PK” in the legend of FIG. 1) | 330 |
| 140 gallon DR-130 maintenance free reactive, liquid only (“DR-130” in the legend of FIG. 1) | 90 |

As apparent from the table above and FIG. 1, the 20 gallon pulsation dampener using a “charge free” design (“PD20 CFC Kit,” using a compressible elastomer or elastomeric foam), offers relatively little pulsation control. The liquid only maintenance free dampener (“DR-130”), which is typically a 135 to 140 gallon spherical design, is superior and limits pulsation levels to as little as 100 psig, peak-to-peak, or less. However, as discussed above, the volume required for the liquid occupies a large space. The reactive fluid maintenance free system (“PD20 RFS PK-PK” offers very good pulsation control across the entire pump operating range. A smaller volume maintenance free discharge dampener can be combined with the reactive fluid-filled dampener as a hybrid design. In addition, while not addressed above, combining the use of a liquid only maintenance free dampener with reactive fluid filled or partially filled dampener allows for a much smaller overall footprint dampener that delivers excellent maintenance free pulsation control over the entire system/pump operating range.

The primary focus of the diaphragm filled or partially filled with reactive fluid (or, for most applications contemplated herein, a hybrid combination of liquids including reactive fluid that may be used interchangeably with reactive fluid liquid) within maintenance free pulsation dampeners is to ensure significant improvement on MPD drilling efficiencies and both MWD/LWD signal response as and when needed during drilling operations. The diaphragm filled or partially filled with reactive fluid essentially allows the driller to continue their mode of operation and gain higher drilling efficiencies in extended reach drilling programs without the need to precharge/recharge the conventional drilling dampener.

Compressible fluids of the type known in the art and contemplated herein typically have a thermal expansion that, when the fluid exposed to the higher temperatures of drilling muds or other fluids in other possible uses, will increase in volume. Accordingly, when the internal bladder volume is completely full, thermal expansion may cause a sufficient rise in internal bladder pressure to reduce the effectiveness of the pulsation energy mitigation and, possibly, result in an increase in pressure sufficient to burst the metal pressure vessel. Options for addressing this issue are described below.

Figure 2:
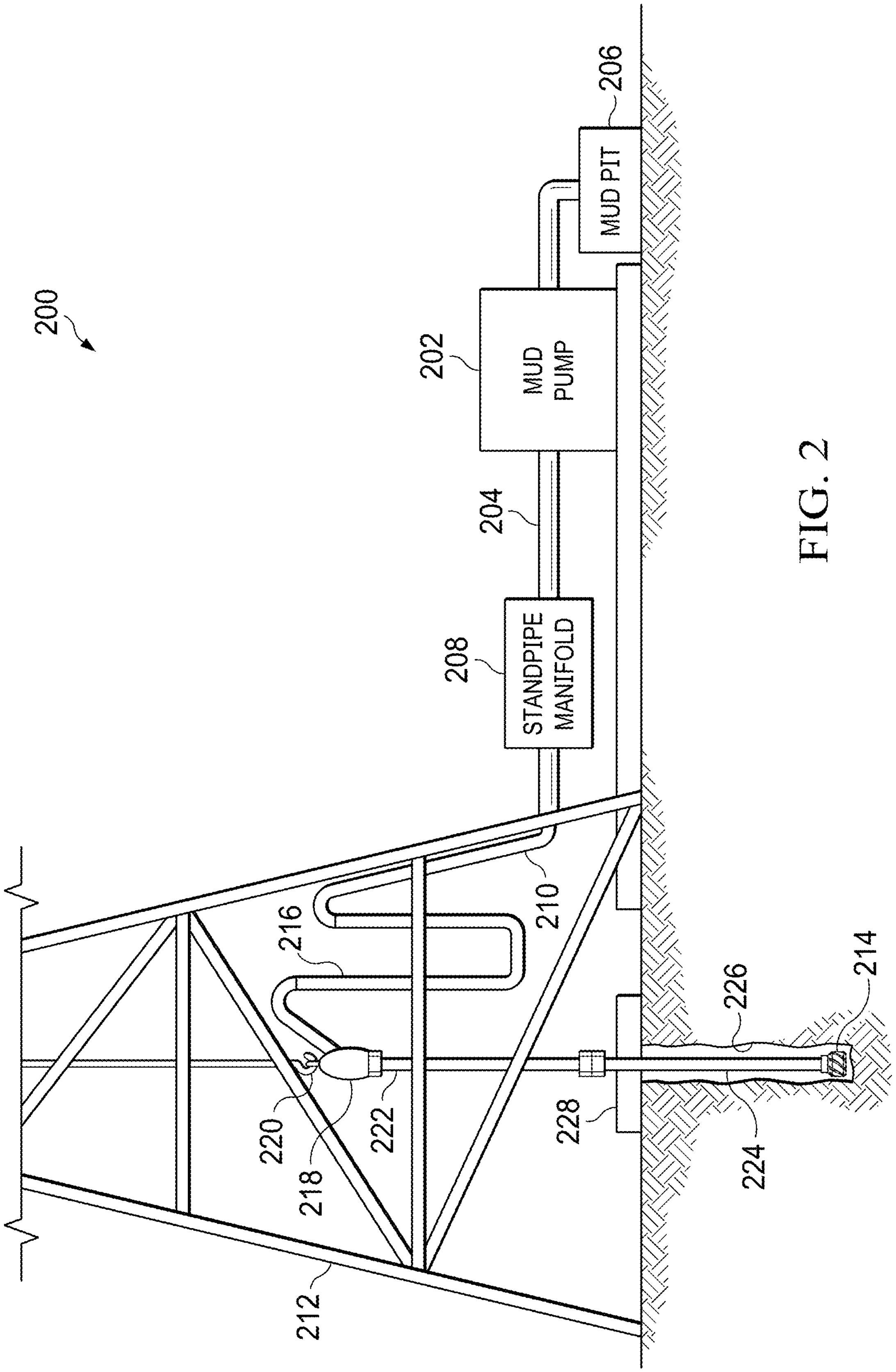
FIG. 2 illustrates a diagrammatic view of a drilling system including a pulsation dampener with a diaphragm filled or partially filled with reactive fluid according to various embodiments of the present disclosure.

FIG. 2 illustrates a diagrammatic view of a drilling system including a pulsation dampener for which a diaphragm filled or partially filled with reactive fluid or (a hybrid combination of liquids) may be employed according to various embodiments of the present disclosure. The embodiment of the drilling system 200 illustrated in FIG. 2 is for illustration only. FIG. 2 does not limit the scope of this disclosure to any particular implementation of a drilling or industrial pump system.

Referring now to FIG. 2, the drilling system 200 includes at least one mud pump 202 having a pulsation dampener (not separately depicted) mounted thereon and connected to the pump discharge line 204, and at least one mud pit 206. The drilling system 200 will also normally include at least one standpipe manifold 208, and at least one standpipe 210 mounted within a drilling rig 212. The drilling system 200 operates to pump mud or other fluids down a well currently being drilled to keep a drill bit 214 from overheating, provide lubrication to the drill bit, and remove rock cuttings to the surface.

A fluid pump or mud pump 202 may pump fluid or mud from a mud pit 206 through the discharge line 204 in the direction of a drilling rig 212. (The term "mud pit" may also reference a fluid reservoir, where the fluid reservoir stores a fluid used during a drilling process). More than one mud pump can be utilized in a drilling system 200 to continue drilling upon the failure of a single mud pump. A pulsation dampener can be installed at the discharge line for each mud pump to further reduce pulsations.

Conventionally, a pulsation dampener is located along the discharge line 204, at the outlet of the mud pump 202 and before the standpipe manifold 208. The standpipe manifold 208 may be installed down the discharge line 204 and is attached to and/or coupled in fluid communication with the drilling rig 212. The standpipe manifold 208 may receive a plurality of different fluid streams from a plurality of mud pumps. The standpipe manifold 208 may then combine all of the fluid streams together to send a single fluid stream up the standpipe 210. Other functions traditionally performed by the standpipe manifold are to provide an auxiliary connection for a supplementary pump and, in systems with multiple standpipes providing operational redundancy in case of failure of one standpipe, to switch fluid flow paths from one standpipe to another. However, those skilled in the art understand that some systems dispense with the standpipe manifold, and simply bring the outlet flows of multiple mud pumps together in a single line somewhere near the mud pumps or downstream, with the combined flow then traveling in a single line to the substructure and upwards toward the standpipe, When the fluid streams from multiple mud pumps are combined (in a standpipe manifold or without one), the pulsations in the resulting combined fluid flow can be enlarged based on the different pulsations of the mud pump (s) 202 being used. For example, the different types or sizes of mud pumps can be used in a single drilling system 200, which would cause variations or pulsations in the fluid flow through the pipe. The mud pump(s) 202 could also be located at different distances from the standpipe manifold 208. The mud pump(s) 202 could begin and/or stop operation at different times, with an operating off cycle (phase) distinct from other mud pumps, or simply be operating at different speeds. Any of the previous operating parameters would affect the flow of fluids or mud into the standpipe manifold 208 causing pulsations at the well.

The standpipe 210 may be installed on the drilling rig 212 and travel up the drilling rig 212 to provide the fluid stream through a rotary hose 216 connected to a swivel 218, the swivel 218 coupled to a rotary hook 220. The standpipe 210 receives discharge from the standpipe manifold, which includes flow from the pump pulsation dampener. The standpipe manifold 208 can include multiple discharges to the standpipe 210 in case of failure in part of the standpipe manifold 208 or associated pipeline The swivel 218 may serve as a passageway for the fluid stream into a Kelly drive 222 (or just "Kelly"). The Kelly 222 connects to a drill string 224. The fluid passes through the Kelly 222 and the drill string 224 down a bore hole 226 to the drill bit 214 disposed at a far end of the drill string 224. The Kelly 222 is typically rotated by a rotary table 228. More recent systems may include a top drive to rotate the drill string 224 as an alternative to the rotary table and Kelly drive, and the present disclosure is applicable to such top drive configurations as well.

Figure 3:
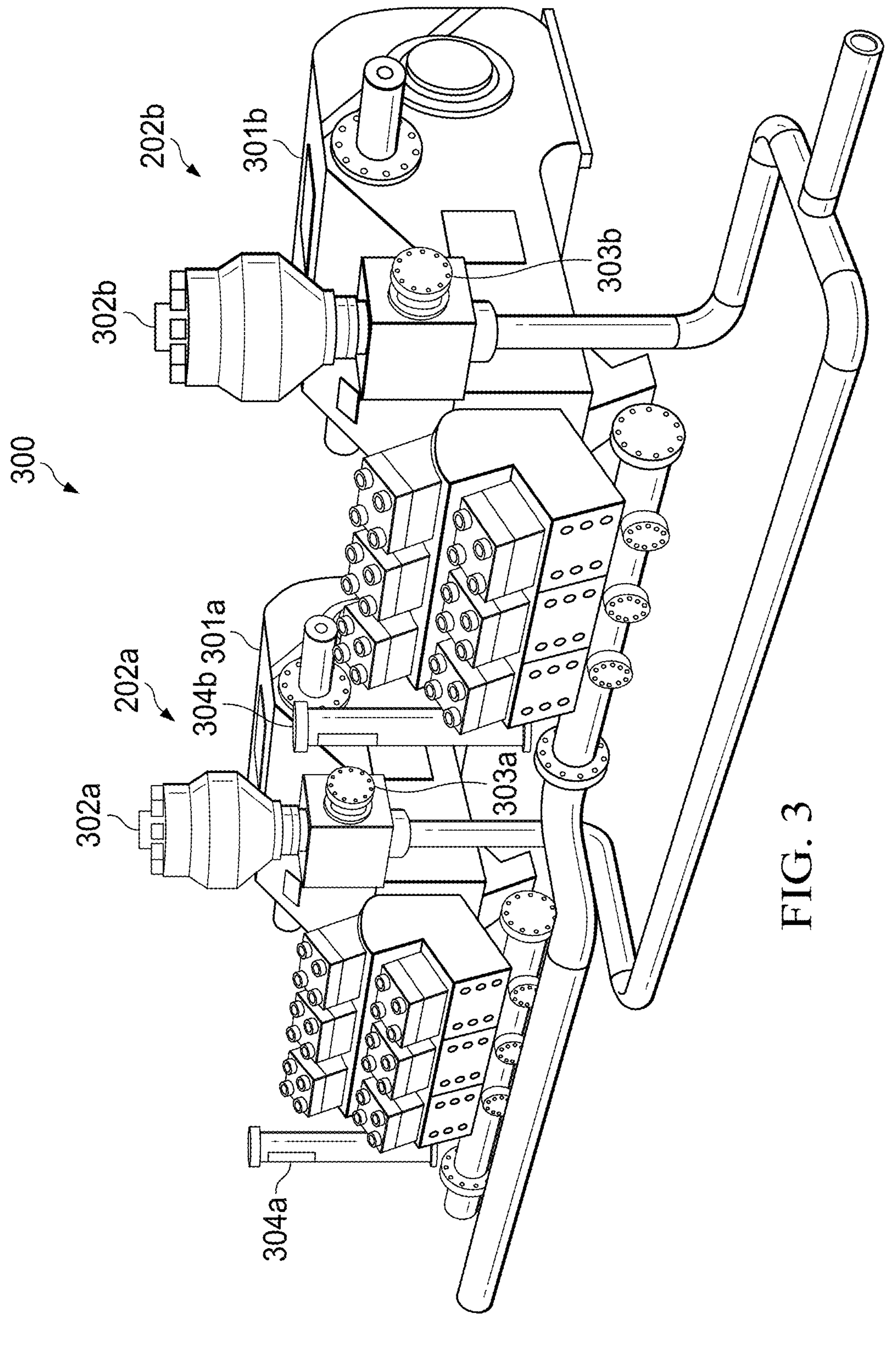
FIG. 3 illustrates a mud pump system pulsation dampener installation for which a diaphragm filled or partially filled with reactive fluid may be employed in accordance with embodiments of the present disclosure.

A single mud pump 202 is depicted diagrammatically in FIG. 2. However, a drilling system may include multiple mud pumps with interconnected flows as depicted in FIG. 3 and described below. In addition, each mud pump includes a pulsation dampener with a diaphragm filled or partially filled with reactive fluid or reactive fluid infused with nitrogen gas (collectively, a "reactive fluid dampener"), constructed and operating as described in further detail below. Each mud pump may alternatively or additionally include either a hybrid combination of a reactive fluid dampener with a liquid only maintenance free pulsation dampener, or the combined use of cellular components (e.g., cylinders, wedges, or other shapes) with reactive fluid, neither of which is separately shown in FIG. 2.

FIG. 3 illustrates a mud pump system pulsation dampener installation for which a diaphragm filled or partially filled with reactive fluid may be employed in accordance with embodiments of the present disclosure. In the example illustrated, two three-cylinder pump systems 202*a*, 202*b* each include a pump 301*a*, 301*b*, an appendage-mounted pulsation dampener 302*a*, 302*b*, a strainer cross 303*a*, 303*b* (also known as a "discharge strainer" or "cross") partially visible in FIG. 3, and a suction stabilizer 304*a*, 304*b*. Pump system 300 may be described as a "multi-pump" system in that the fluid streams from pumps 301*a* and 301*b* are combined at some point downstream from at least one of the two pumps to form a single fluid stream within piping, other pumps or functional fluid handling components (e.g., strainer or standpipe manifold), and/or pulsation dampeners, as distinct from pump installations that merely accumulate separate fluid flows from multiple pumps within a storage tank or the like.

Pulsation dampeners 302*a*, 302*b* are each mounted on top of a corresponding strainer cross 303*a*, 303*b*. Each strainer cross 303*a*, 303*b* is connected to the discharge of the respective pump 301*a*, 301*b*, to filter solids larger than a predetermined size from the pumped fluid. Suction stabilizers 304*a*, 304*b* are connected to the inlet of the respective pump 301*a*, 301*b* contribute to the absorption of pressure pulsations.

Each pulsation dampener 302*a*, 302*b* contains a flexible, bag-shaped diaphragm filled or partially filled with reactive fluid. In some configurations, space and support are key and in/out flow-through piping is required. For use of typically-sized (e.g., 20 gallon) appendage-mounted pulsation dampeners 302*a*, 302*b*, pump skids and piping may be of standard design. For use of the hybrid combination of liquid only maintenance free pulsation dampener(s) (not shown) with reactive fluid-filled pulsation dampener 302*a*, 302*b*, modifications and space within the pump room may be required.

Figure 4A:
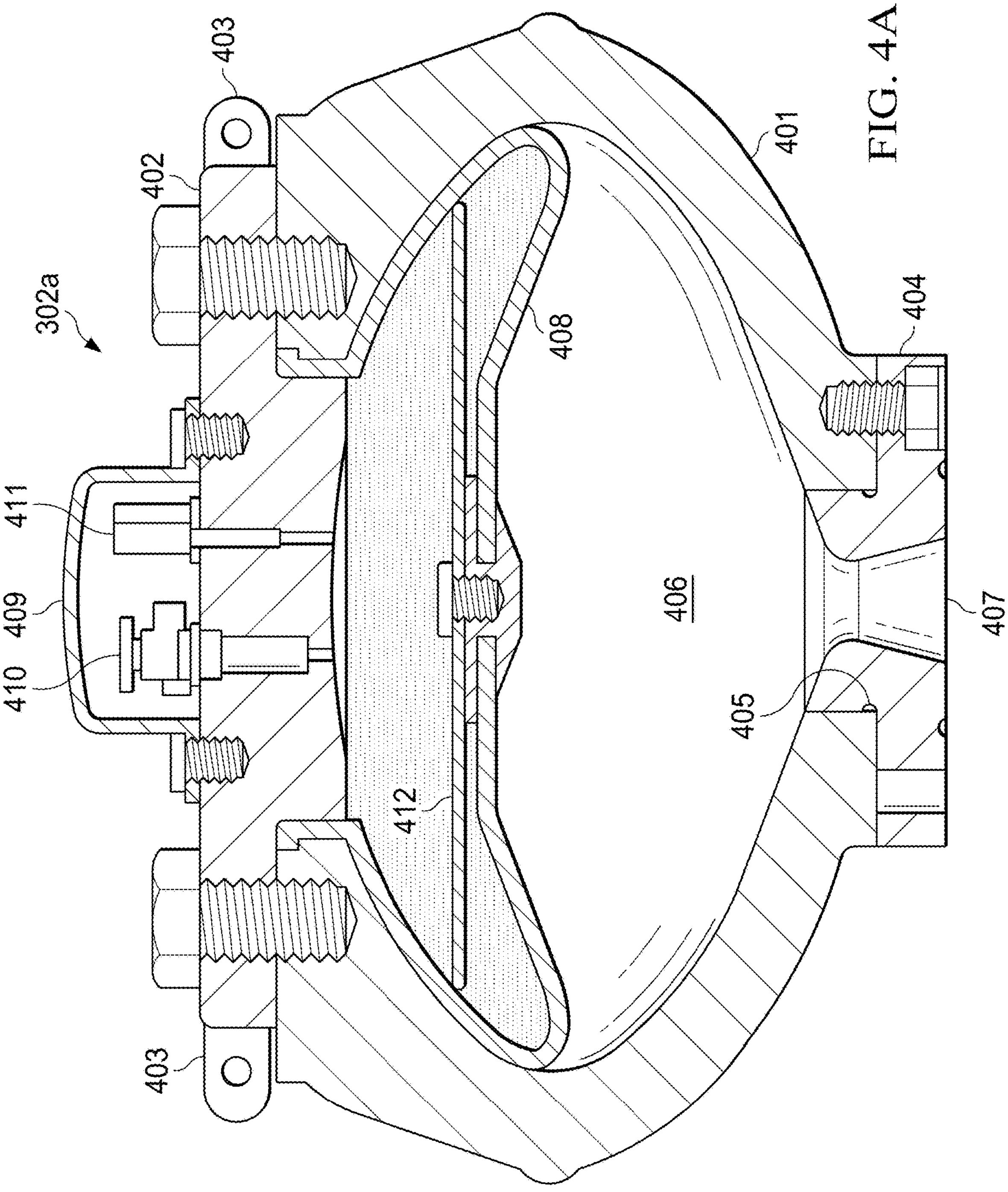
FIGS. 4A and 4B are cross-sectional diagrams illustrating a reactive fluid-filled pulsation dampener and its operation according to embodiments of the present disclosure.
Figure 4B:
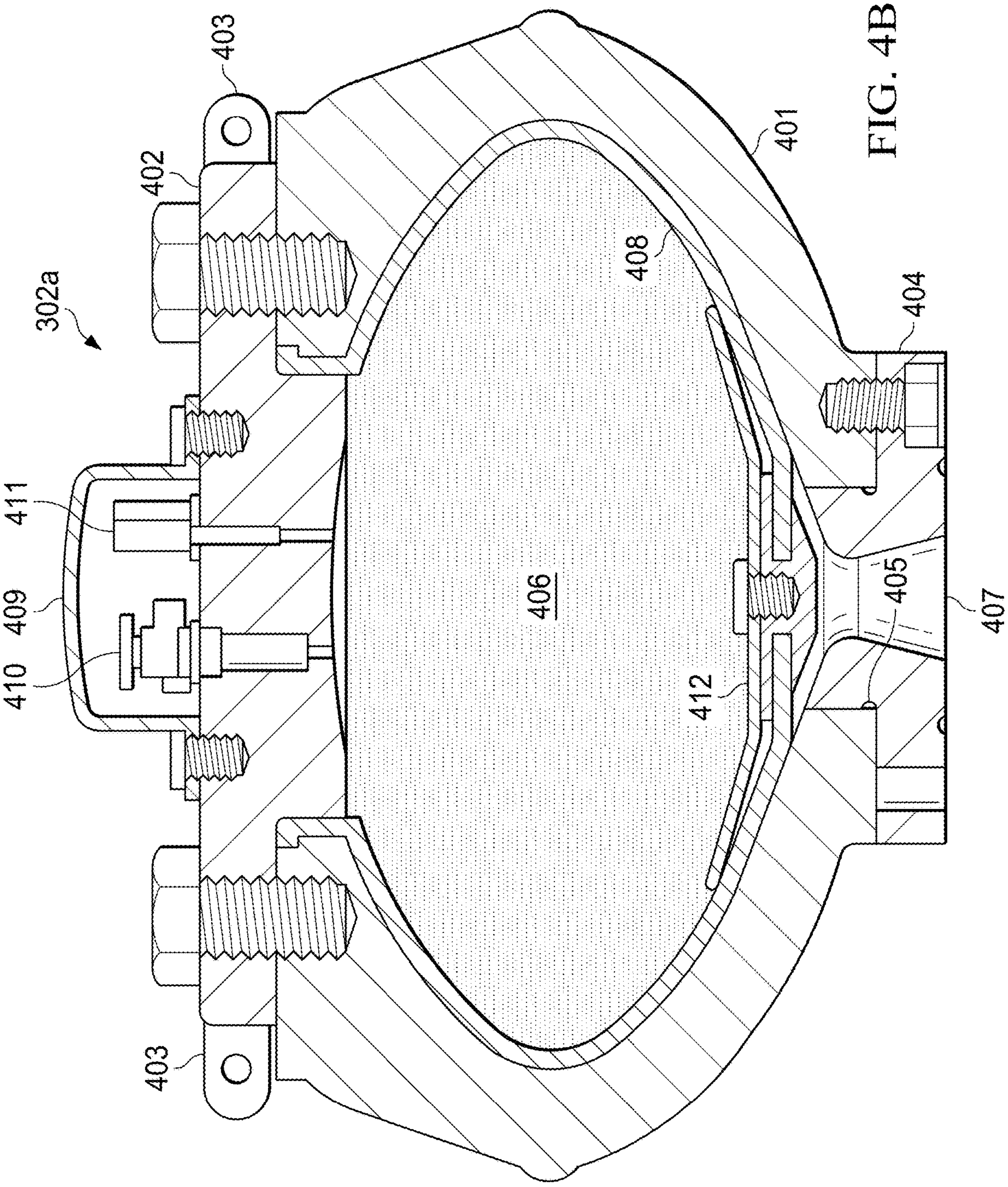

Cross-sections of a reactive fluid-filled pulsation dampener according to embodiments of the present disclosure are depicted in FIGS. 4A and 4B. As depicted, the reactive fluid-filled pulsation dampener 302*a* includes a body 401 having an upper opening receiving and sealed by a cover plate 402 including a pair of lifting ears 403, and a lower opening receiving and sealed by a bottom plate 404. As shown, the cover plate 402 and the bottom plate 404 may be bolted to the body 401, with gasket(s) 405 sealing an internal cavity 406 formed by the body 401, cover plate 402 and bottom plate 404 combined. The internal cavity 406 is connected to pump system fluid piping (not shown) via a lower opening 407 providing a system connection to the strainer cross (also not shown). A flexible, bag-shaped, internal diaphragm 408 within the internal cavity 406 is filled with reactive fluid. In the example shown, a portion of the diaphragm 408 seals the interface between the body 401 and the cover plate 402, instead of a separate gasket.

Fluid from the connected piping enters and/or leaves the cavity 406 via the lower opening 407. The pressure of that fluid relative to the pressure of the reactive fluid within the diaphragm 408 will cause the lower surface of the diaphragm 408, which is in contact with the pumped system fluid, to shift such that the volume within the cavity 406 that is occupied by the reactive fluid within the diaphragm 408 changes.

FIG. 4B illustrates the position of the diaphragm 408 holding a full charge (e.g., about 20 gallons) of reactive fluid exposed to a low (e.g., atmospheric) pressure through the lower opening 407. High pump fluid pressure at the lower opening 407 will cause the diaphragm 408 and the reactive fluid therein to be compressed into a volume smaller than the size of the internal cavity 406, as shown in FIG. 4A. Mid-range or low pressure, or transition from high pressure to low pressure, will cause the diaphragm and the reactive fluid contained therein to expand into a larger volume. Low fluid pressure at the lower opening 407 will allow the diaphragm 408 and the reactive fluid therein to expand essentially to a maximum volume allowed by the internal cavity 406 of the body 401, cover plate 402 and bottom plate 404, as shown in FIG. 4B. The reactive fluid within the diaphragm 408 thus acts to absorb pressure pulses within the pump fluid and reduce the peak pressure variations that may occur.

The pulsation dampener 302*a* may optionally include a guard 409 covering a high pressure fill valve 410 for receiving liquid reactive fluid during initial fill or replenishment and a pressure gauge 411 to indicate reactive fluid pressure during pump operation. A diaphragm stabilizer 412 in the form of (for example) a semi-rigid plate may be attached to a bottom of the diaphragm 408 helps maintain the shape of the diaphragm 408 across repetitive cycles of pressure pulsation dampening.

Figure 5:
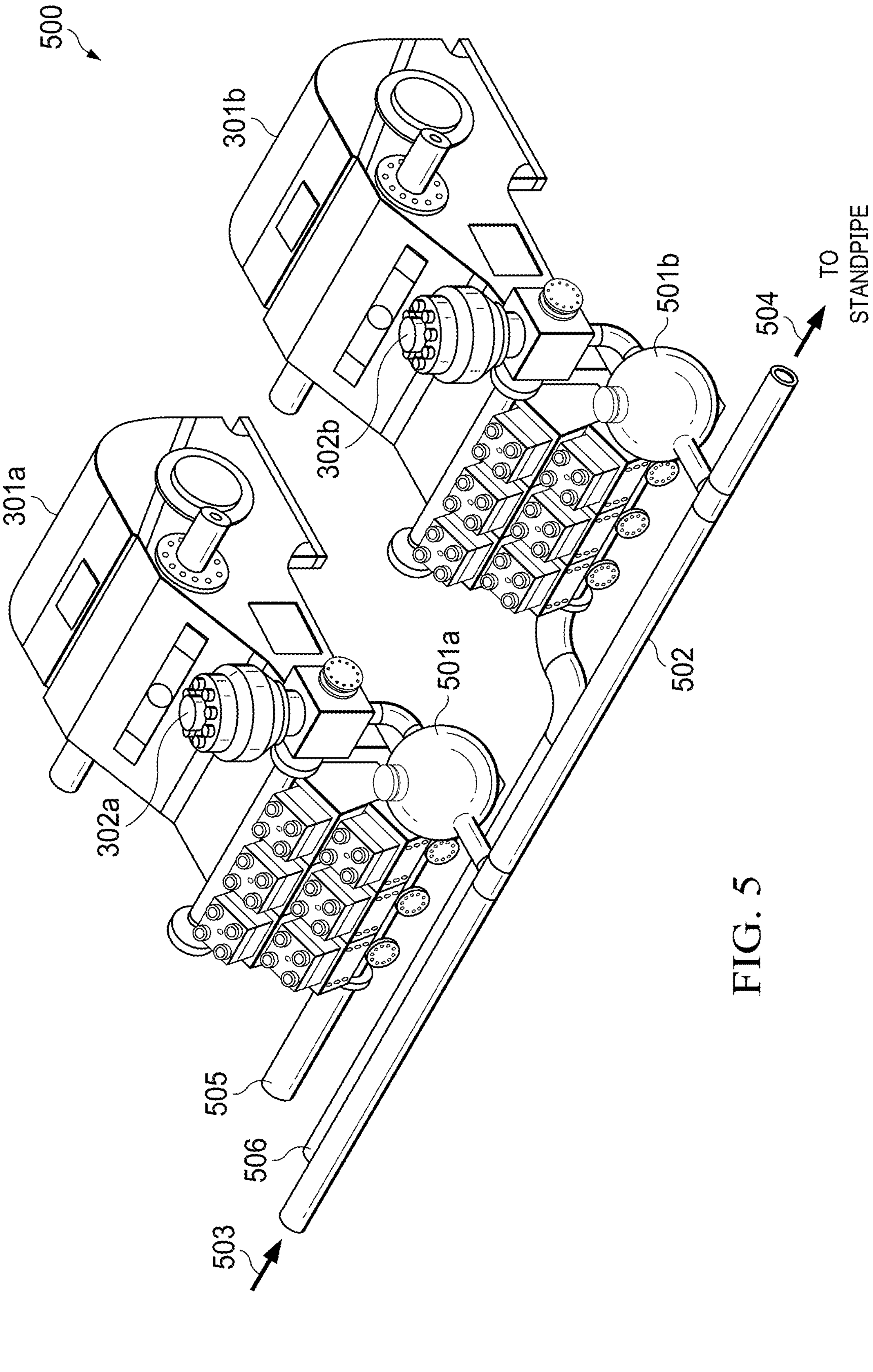
FIG. 5 depicts an embodiment of a piping network within which a hybrid reactive fluid dampener in accordance with embodiments of the present disclosure may be installed.

FIG. 5 depicts an embodiment of a piping network within which a hybrid reactive fluid dampener in accordance with embodiments of the present disclosure may be installed. As depicted in FIG. 5, a portion of a pump system 500 includes at least two pumps 301*a* and 301*b* each pumping fluids, and optionally additional pumps (not shown). Like pump system 300, pump system 500 may be described as a “multi-pump” system.

Within pump system 500, reactive fluid pulsation dampeners 302*a*, 302*b* may be mounted on a strainer-cross at the outlet of the respective pump 301*a*, 301*b* as described above connection with FIG. 3. In addition, a hybrid reactive fluid dampener 501*a*, 501*b* in accordance with embodiments of the present disclosure may be coupled between the outlet of a pump 301*a*, 301*b* and a header pipe 502. That is, as shown in the example of FIG. 5, a hybrid reactive fluid dampener 501*a* is coupled between the outlet of pump 301*a* and the header pipe 502, while a hybrid reactive fluid dampener 501*b* is coupled between the outlet of pump 301*b* and the header pipe 502. The header pipe 502 may optionally receive fluid output 503 from other pumps (not shown). The header pipe 502 feeds fluid 504 into a standpipe as described above. Pumps 301*a* and 301*b* receive fluid streams from separate inlet pipes 505 and 506, respectively.

Figure 6:
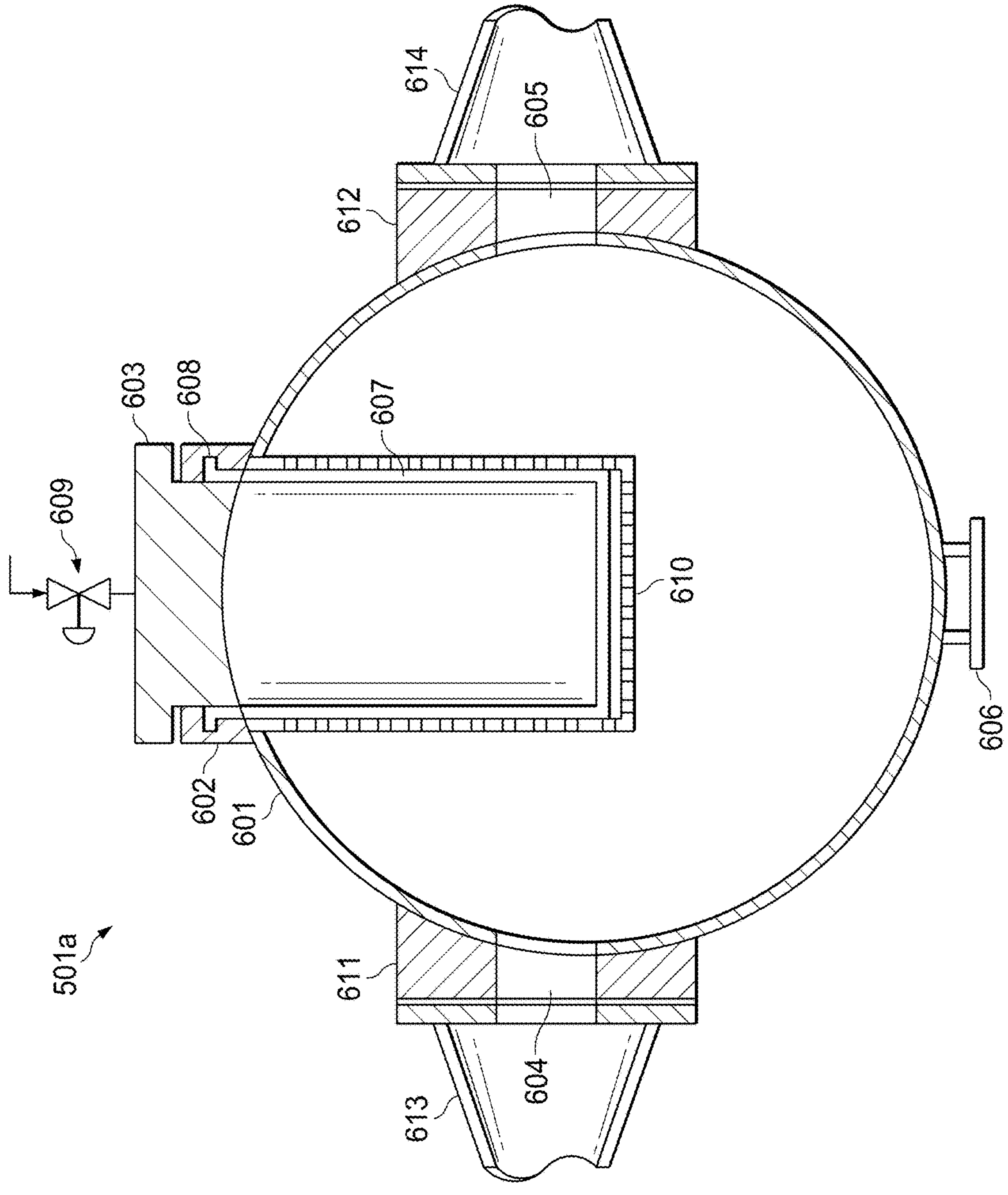
FIG. 6 is a cross-sectional diagram illustrating a hybrid reactive fluid dampener in accordance with embodiments of the present disclosure.

FIG. 6 is a cross-sectional diagram illustrating a hybrid reactive fluid dampener in accordance with embodiments of the present disclosure. The dampener 501*a* includes a spherical body 601 having an upper cylindrical turret 602 surrounding an upper opening and enclosed with a cover plate 603. The body 601 includes in inlet 604 on one side of the body 601, the inlet 604 receiving pumped fluid from the pump, and an outlet 605 on an opposite side of the body 601, the outlet 605 discharging pumped fluid into the downstream system (e.g., to a standpipe to be pumped downhole). The body 601 may be fitted with a stand 606 for support and providing flanges to (for example) bolt the stand to a mounting surface.

The body 601 may be sized to hold an amount of pumped fluid (e.g., 40 gallons) selected to provide reactive pulsation dampening under the expected operating conditions of the pump system. Suspended from the turret 602 into an interior of the body 601 is a containment diaphragm+that may be contained by a perforated containment shell 610 or held in suspension by a seal or lip 608 and filled with reactive fluid through fill valve 609. The reactive fluid-filled diaphragm 607 contributes to dampening of pressure pulsations in the pumped fluid passing through the body 601. The inlet 604 and the outlet 605 may optionally each be designed with a studded connection 611, 612 for connection to respective system piping 613, 614.

Figure 7A:
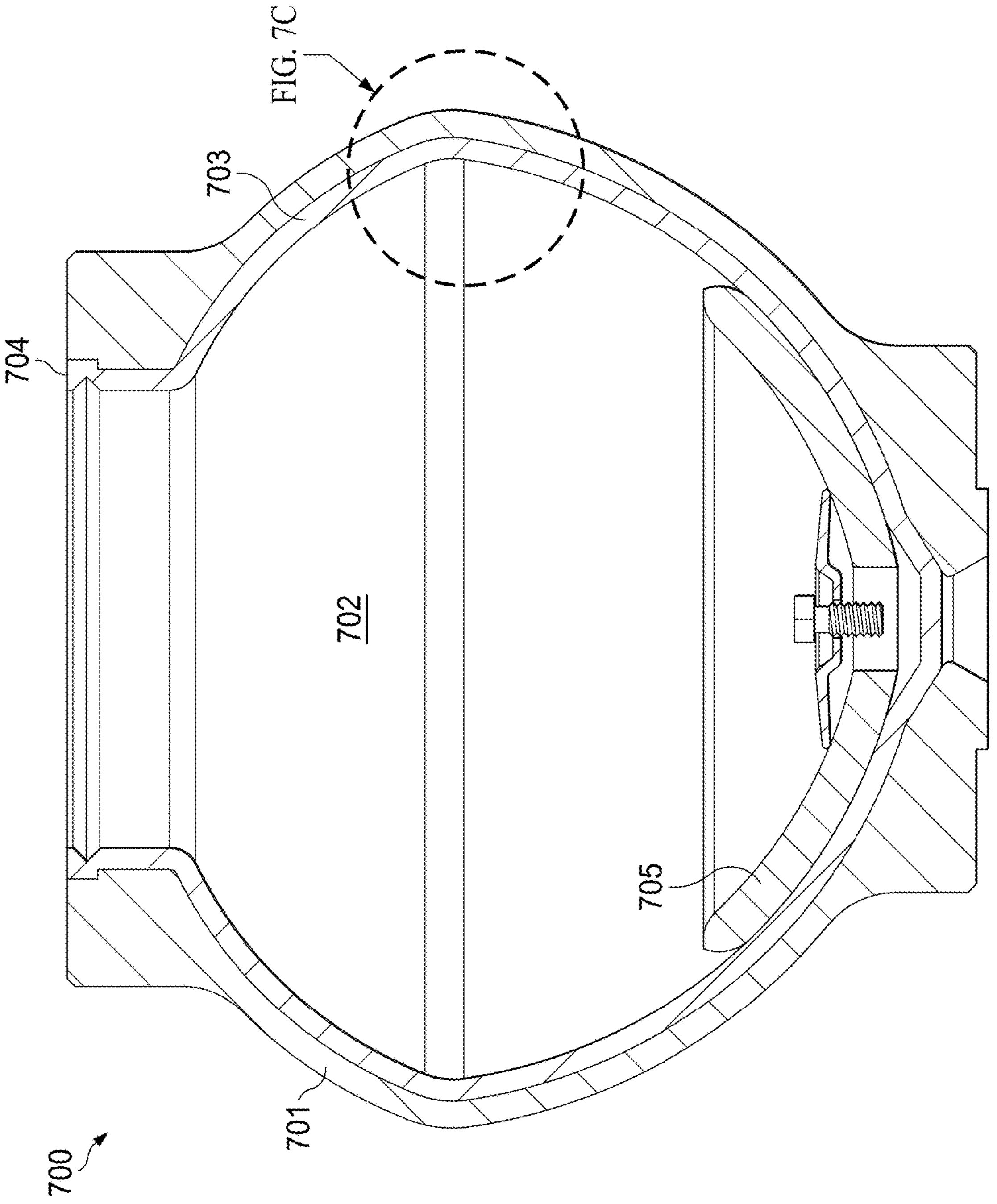
FIGS. 7A through 7I are various views illustrating a combination reactive fluid and compressive elastomer dampener in accordance with embodiments of the present disclosure.
Figure 7C:
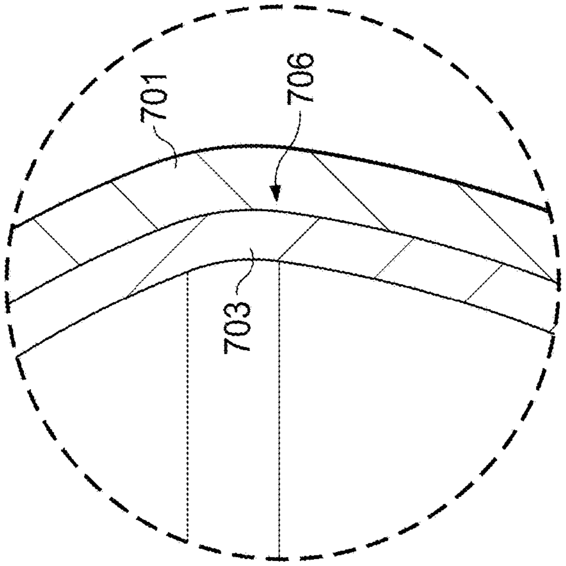
Figure 7B:
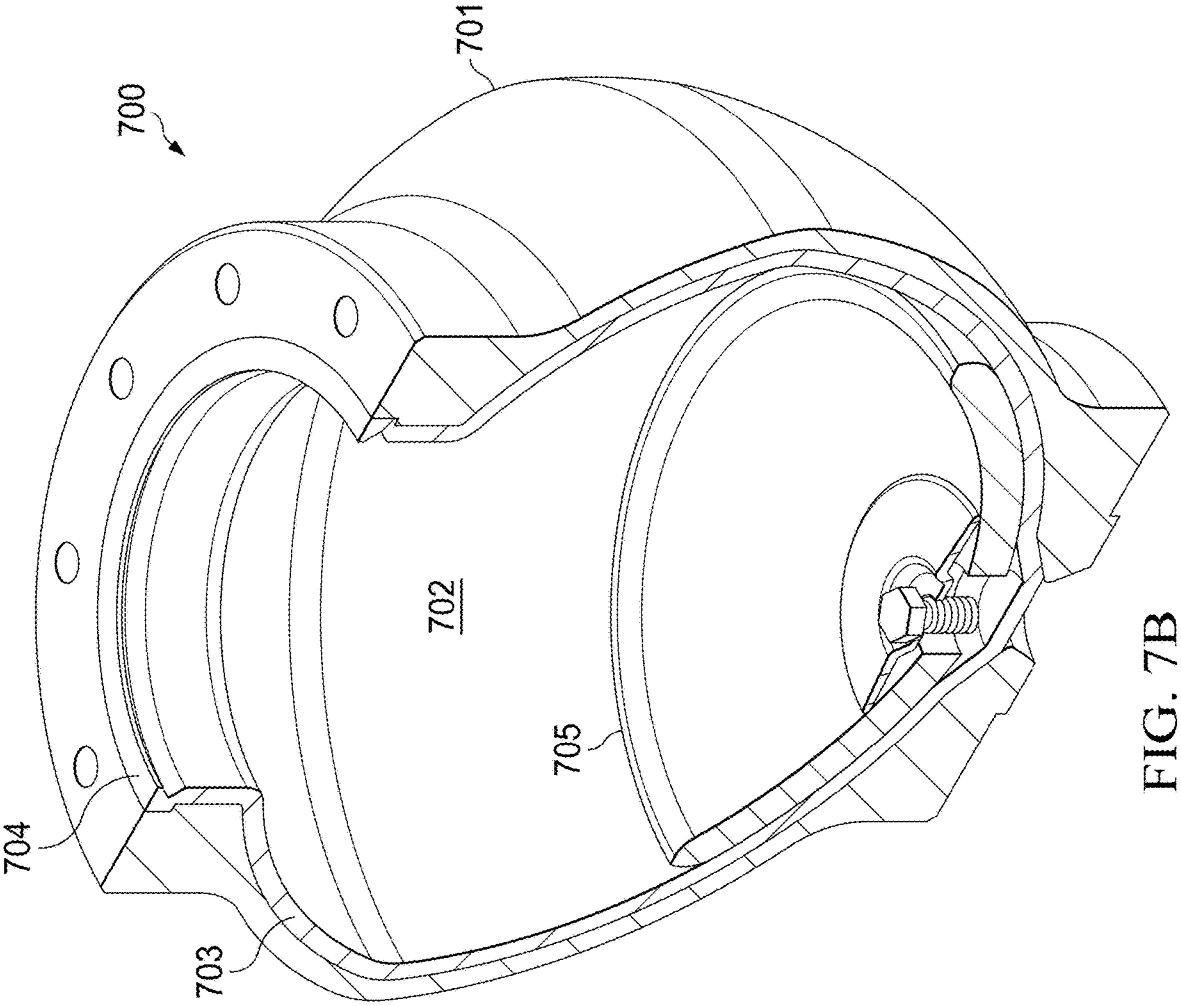
Figure 7D:
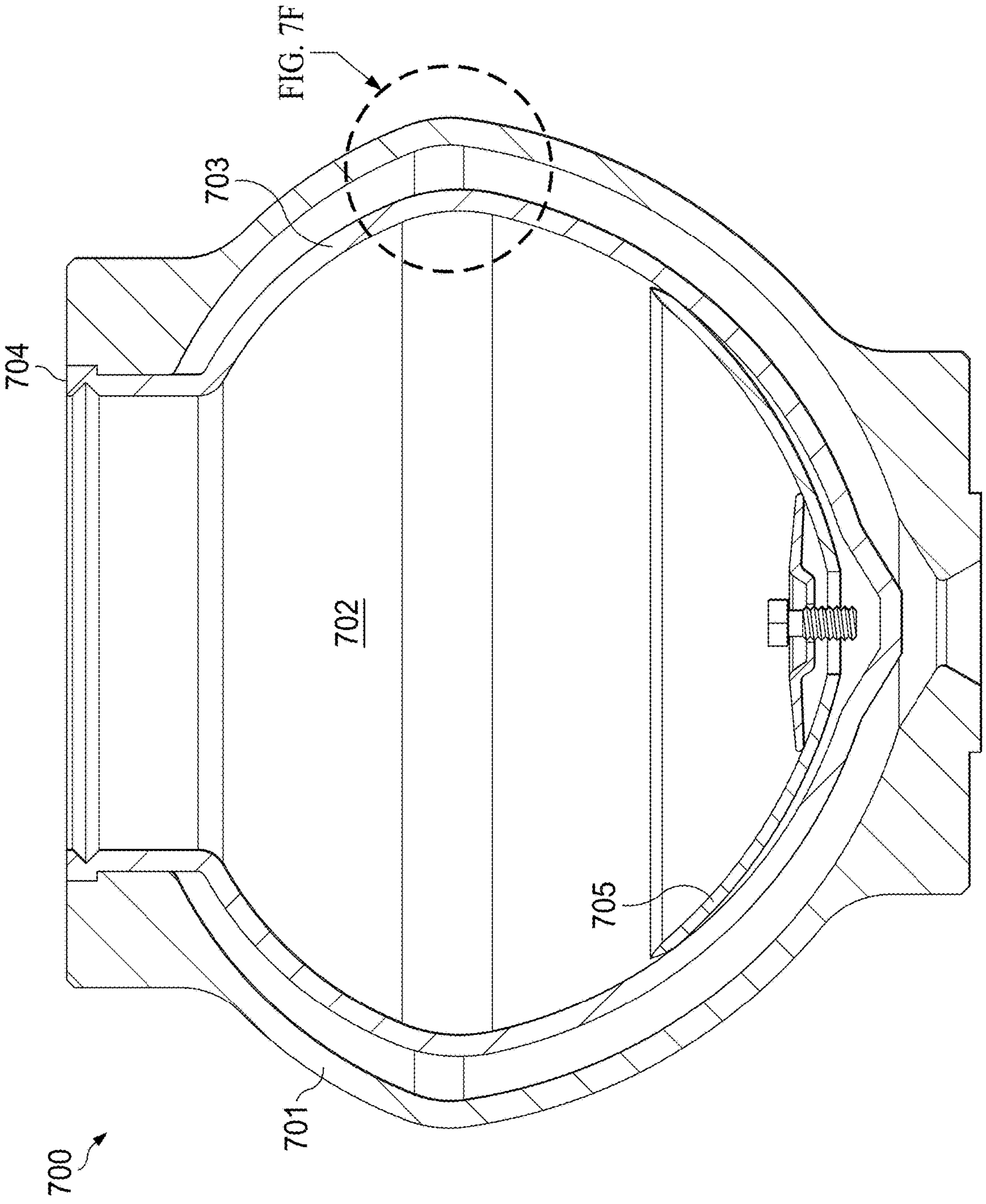
Figure 7F:
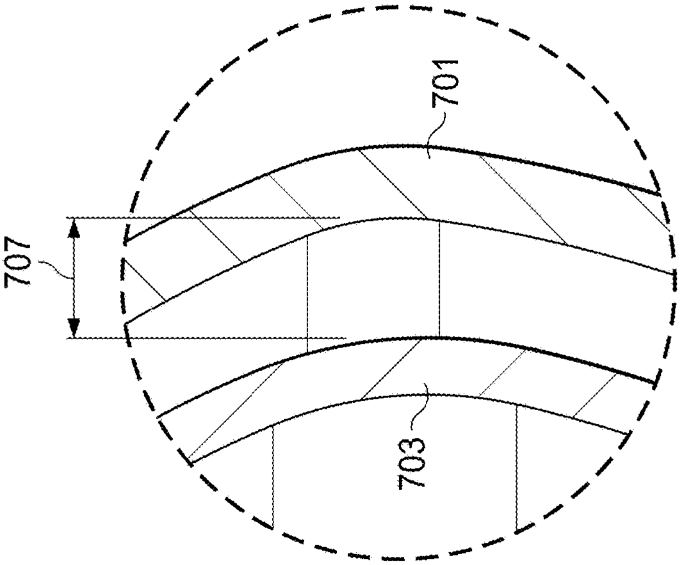
Figure 7E:
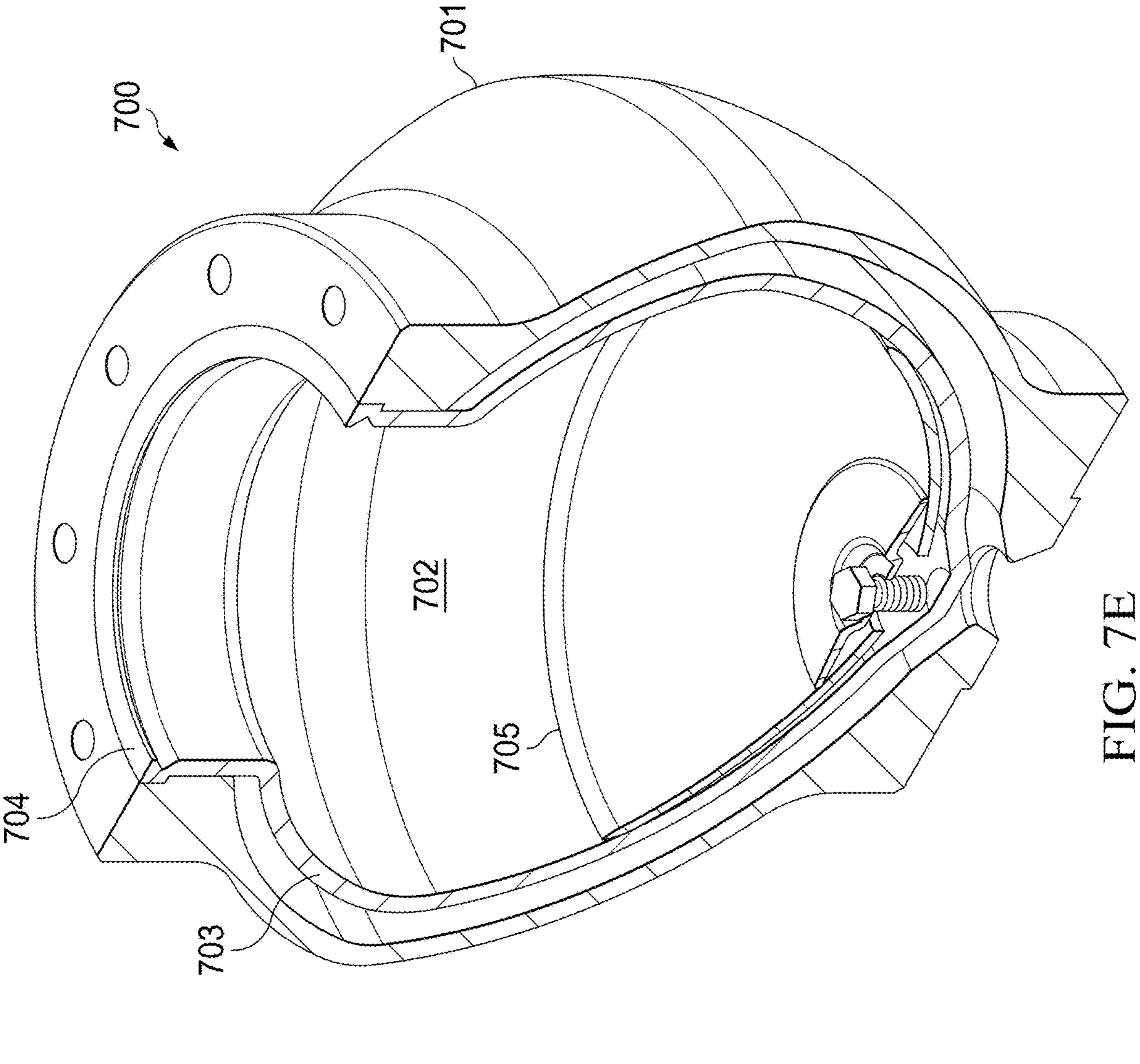
Figure 7G:
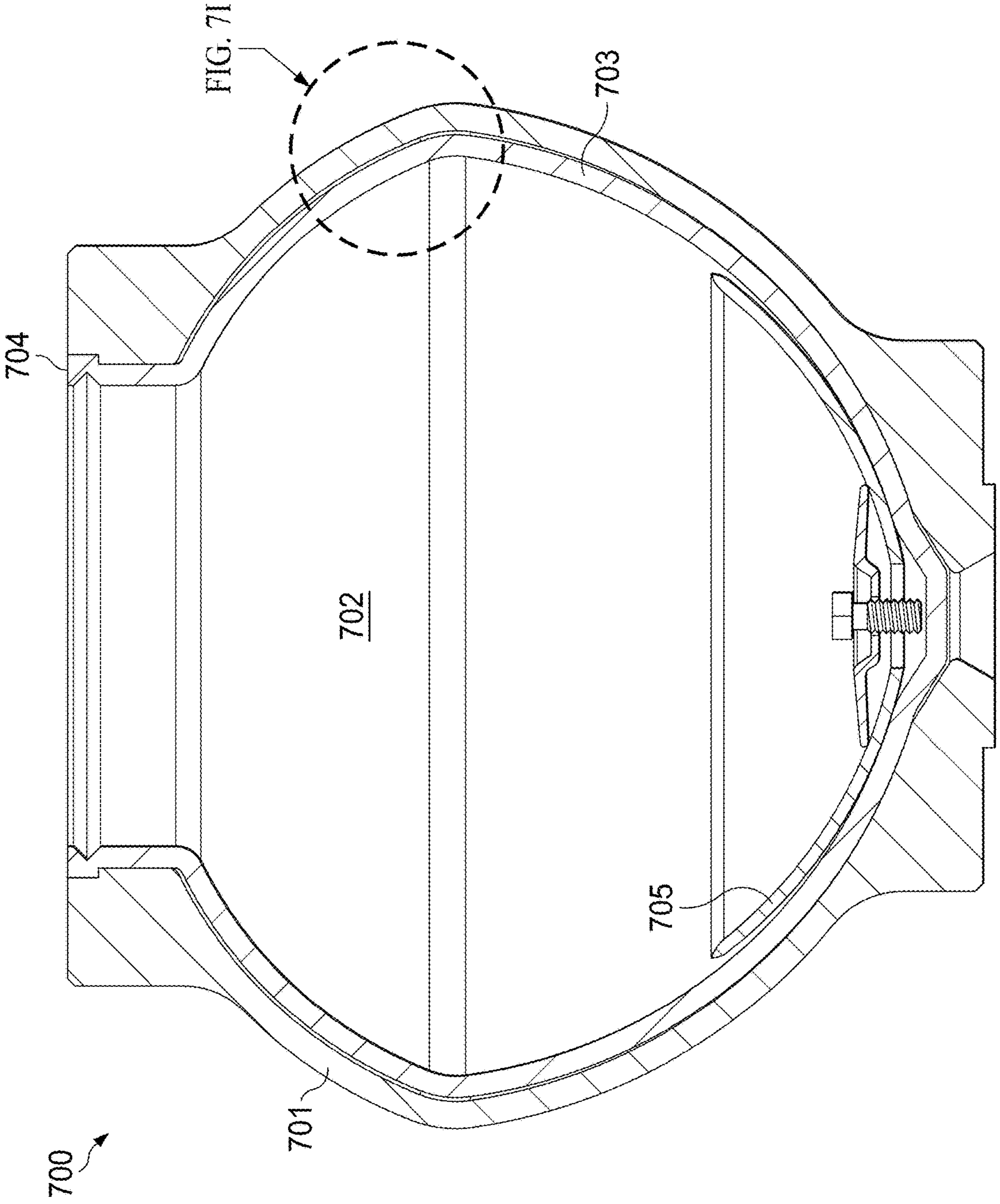
Figure 7I:
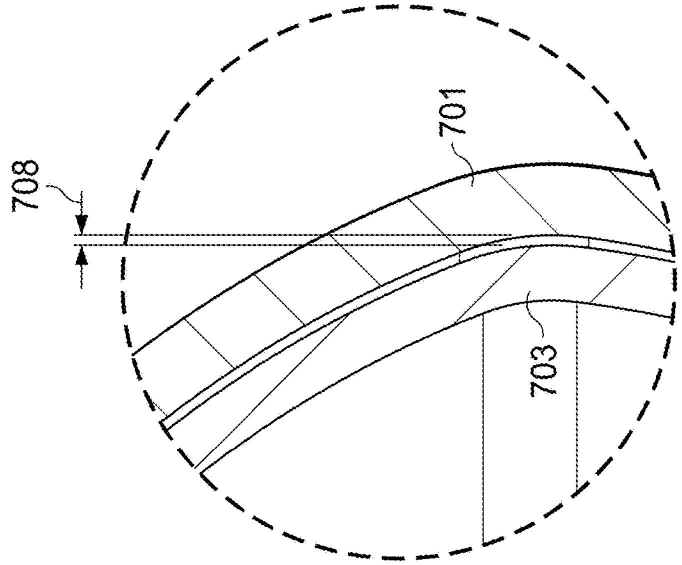
Figure 7H:
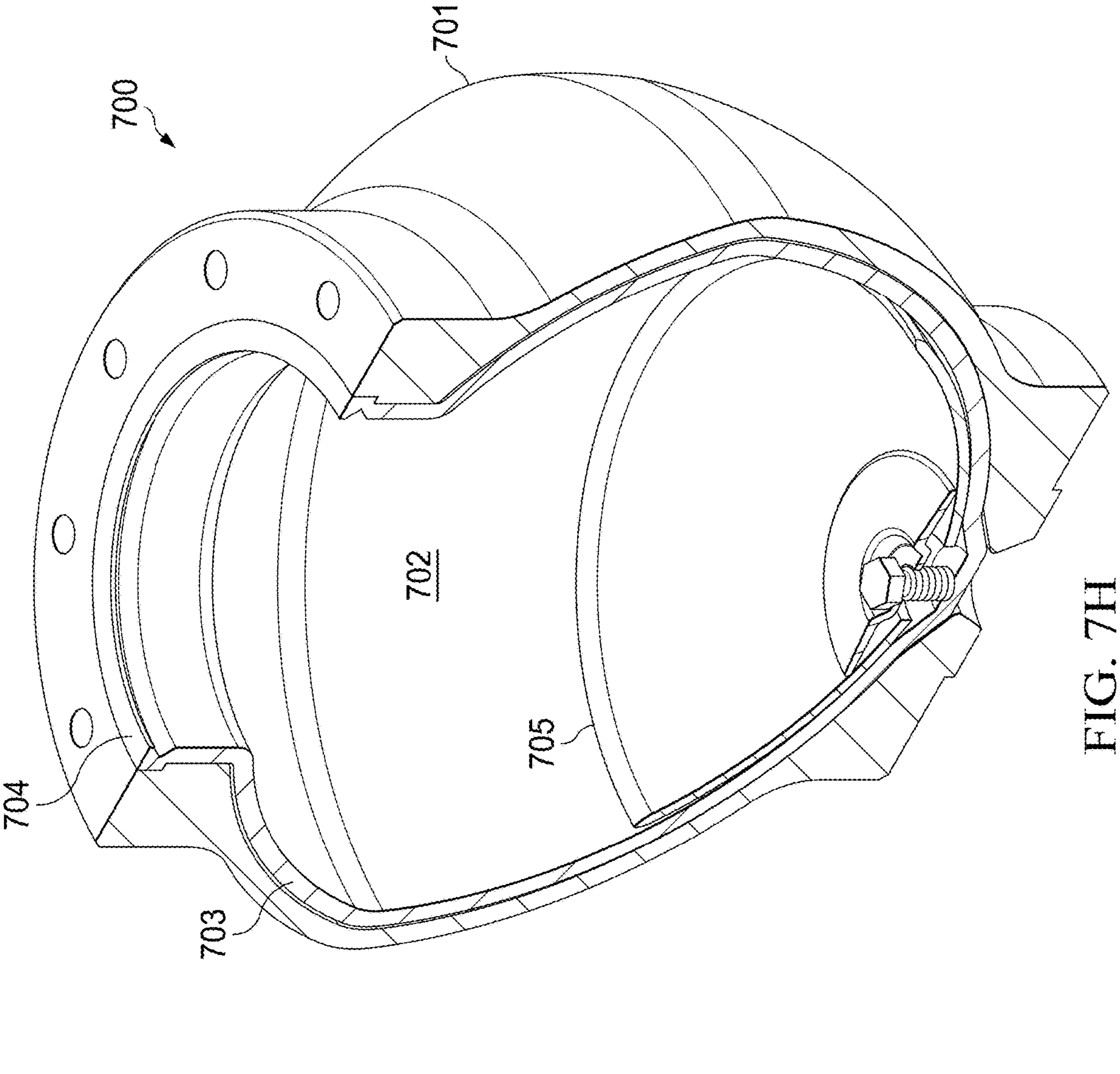

FIGS. 7A, 7D and 7G are cross-sectional diagrams, and FIGS. 7B, 7E and 7H are corresponding cut-away perspective views. illustrating a combination reactive fluid and compressive elastomer dampener in accordance with embodiments of the present disclosure. FIGS. 7C, 7F and 7I are enlargements of a portion of the sectional views of FIGS. 7A, 7D and 7G, respectively, taken at area A.

Analogous to FIG. 4A, pulsation dampener 700 includes a body 701 having an upper opening receiving and sealed by a cover plate (not shown), and a lower opening. The cover plate (not shown) may be bolted to the body 701, with gasket(s) sealing an internal cavity 702 formed by the body 701, the cover plate combined. The internal cavity 702 is connected to pump system fluid piping (not shown) via the lower opening, providing a system connection to the strainer cross (also not shown). A portion 704 of a non-perforated internal diaphragm 703 within the internal cavity 702 seals the interface between the body 701 and the cover plate, instead of a separate gasket. A diaphragm stabilizer 705 serves the same function described above, and may be fastened to a metal insert molded within the material of the diaphragm 703.

The diaphragm 703, which may be formed of standard material and have a conventional shape, may be partially filled with a combination of elastomeric shapes and liquid reactive fluid. The elastomeric shapes are a compressible foam material, such as a closed cell foam. In one example, the diaphragm 703 may be filled with elastomeric wedges or elastomeric balls. However, the elastomeric addition to a liquid reactive fluid system may take any form or shape or combination of shapes. Spaces between the elastomeric shapes are filled with a liquid reactive fluid. In operation, the compressible foam material will compress under the pressure applied to the exterior of the internal diaphragm by the pumped fluid and the internal pressure of the liquid reactive fluid, creating a "gap" between the exterior of the internal diaphragm 703 and the interior of the body 701 to account for thermal expansion. The compressible foam material will quickly go completely flat when pressure is applied, thus creating the largest available volume for thermal expansion.

Alternatively, the compressible foam material may be integrated into diaphragm stabilizer 705—that is, diaphragm stabilizer 705 may be formed wholly or partially of compressible foam material. The views of FIGS. 7A, 7B and 7C show the relative position of structures depicted when the bladder 703 contains liquid reactive fluid but before pressure of pumped fluid is applied to the exterior of the bladder 703 and before thermal expansion of the liquid reactive fluid. The internal volume of the body 701 and the size and shape of the bladder 703, after expansion due to the presence of liquid reactive fluid within the bladder 703, leaves virtually no gap 706 between the exterior of the bladder 703 and the interior surface of the body 701.

The views of FIGS. 7D, 7E and 7F show the relative position of structures depicted when the bladder 703 contains liquid reactive fluid and after initial pressure of pumped fluid is applied, but before thermal expansion. As evident, the liquid reactive fluid within the bladder 703 may be at least somewhat compressed due to external pressure on the bladder 703, resulting in a gap 707 between the exterior of the bladder 703 and the interior surface of the body 701 that will be larger than that in FIGS. 7A, 7B and 7C.

The views of FIGS. 7G, 7H and 7I show the relative position of structures depicted when the bladder 703 contains liquid reactive fluid and after both the operating pressure of pumped fluid is applied to the exterior of the bladder 703 and thermal expansion of the liquid reactive fluid occurs. As shown, the compressible foam material within the diaphragm stabilizer 705 may be at least somewhat compressed by the increased internal pressure resulting from the thermal expansion of the compressible fluid, and the gap 708 between the exterior of the bladder 703 and the interior surface of the body 701 will be reduced relative to the gap 707 in FIGS. 7D, 7E and 7F.

By providing either compressible foam material inside the bladder, or a gap between the exterior of the bladder and the interior surface of the body, or a combination of both, the effects of thermal expansion by the liquid reactive fluid within the bladder may be compensated, allowing the pulsation dampener to continue to effectively mitigate pulsations.

Figure 8A:
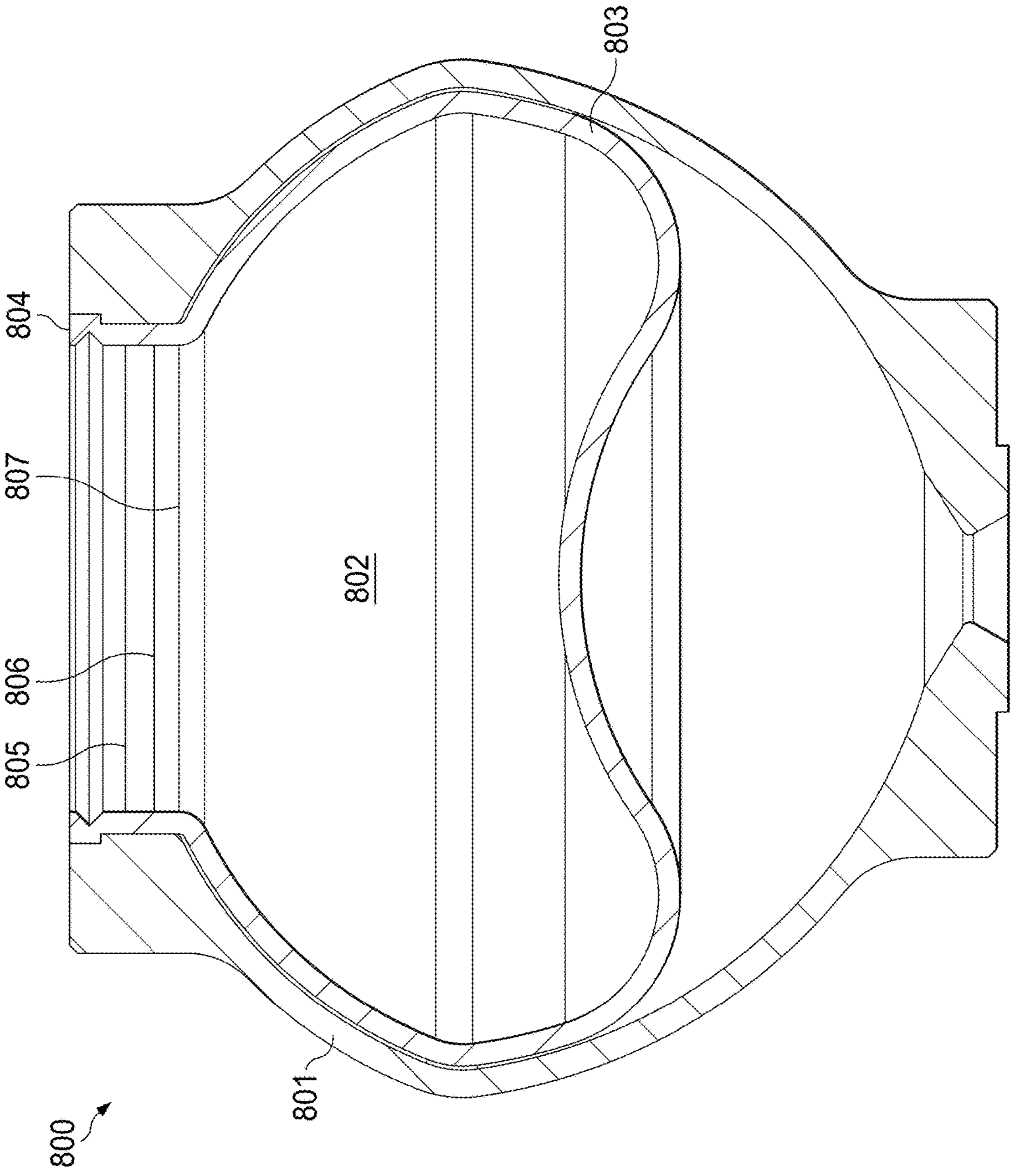
FIGS. 8A through 8E illustrate a liquid reactive fluid dampener accommodating thermal expansion in accordance with embodiments of the present disclosure.
Figure 8B:
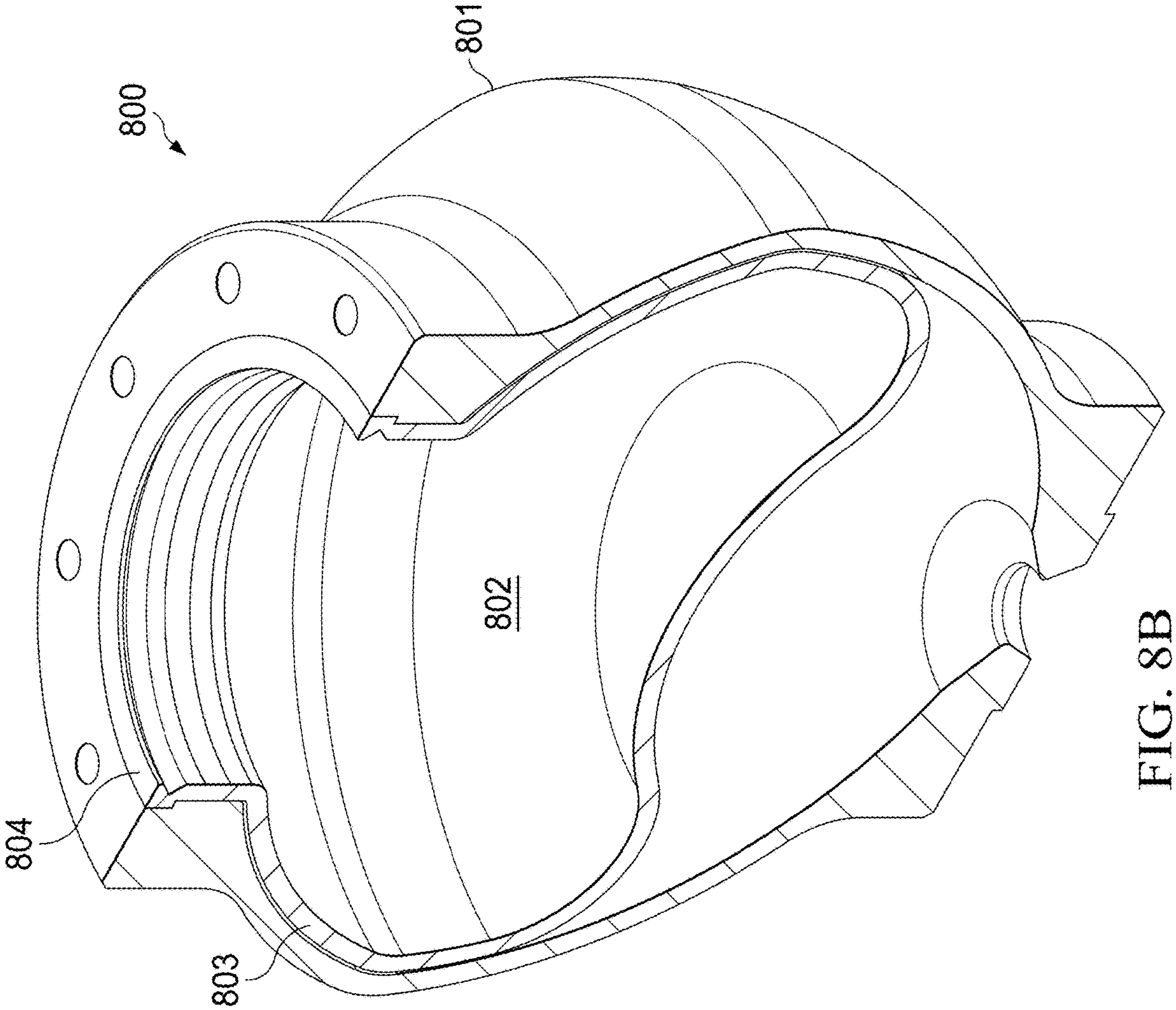
Figure 8C:
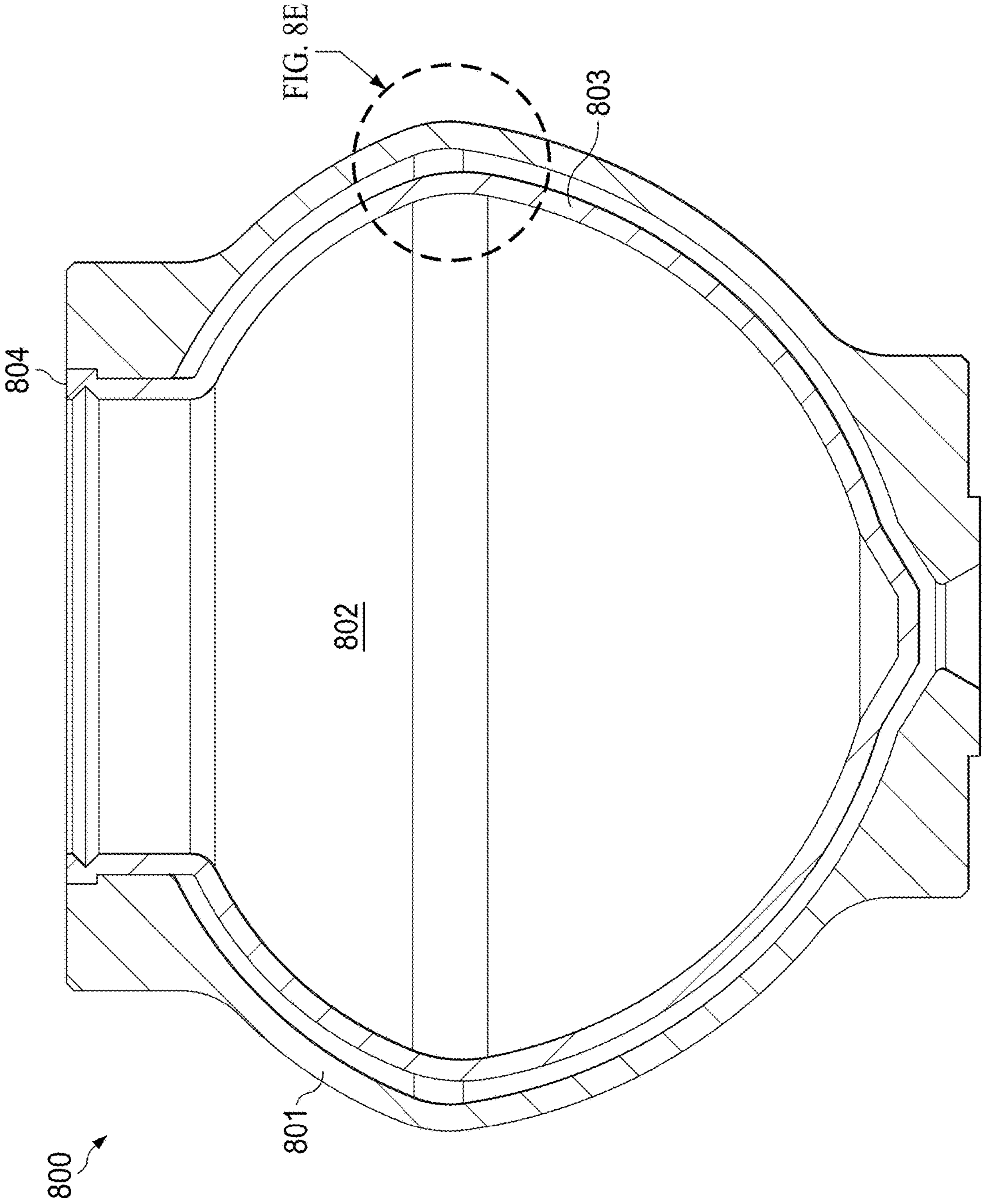
Figure 8E:
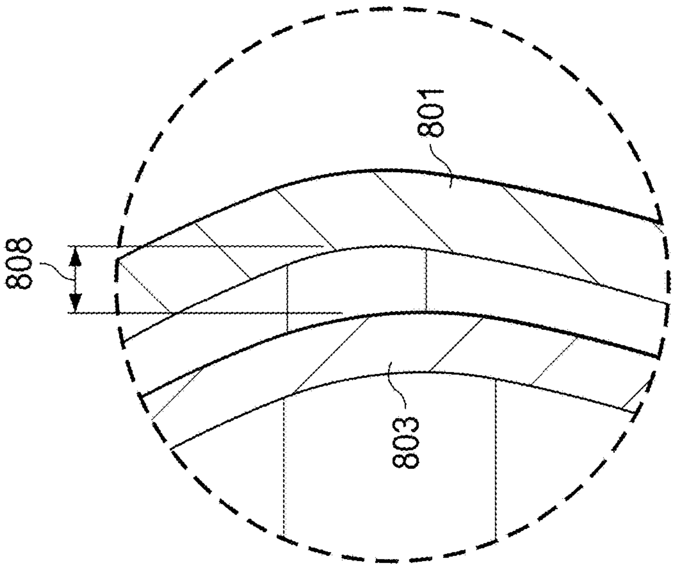
Figure 8D:
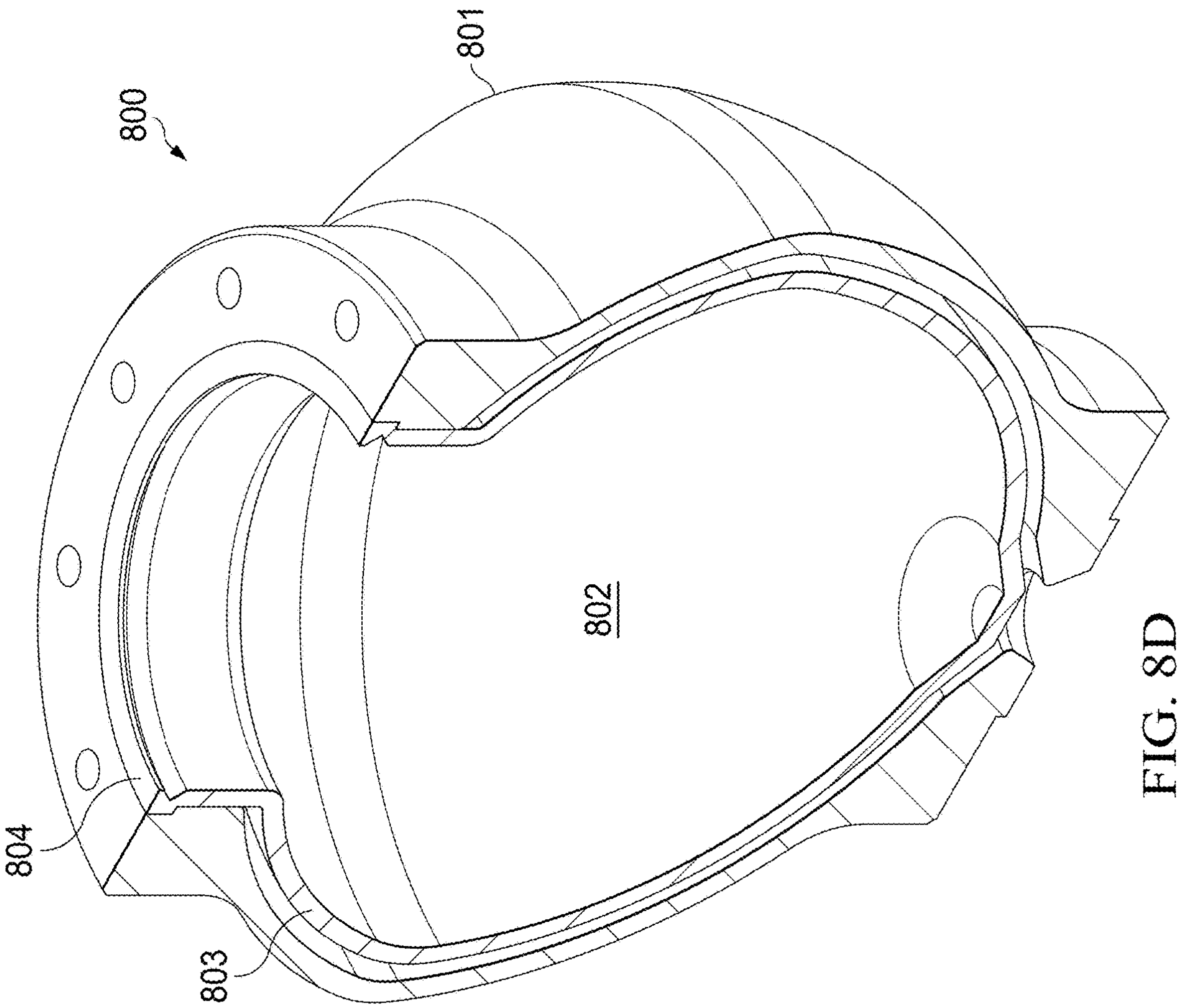

FIGS. 8A and 8C are cross-sectional diagrams, and FIGS. 8B and 8D are corresponding cut-away perspective views. illustrating a liquid reactive fluid dampener accommodating thermal expansion in accordance with embodiments of the present disclosure. FIG. 8E is an enlargement of a portion of the sectional view of FIG. 8C taken at area A.

Once again analogous to FIG. 4A, pulsation dampener 800 includes a body 801 having an upper opening receiving and sealed by a cover plate (not shown), and a lower opening. The cover plate may be bolted to the body 801, with gasket(s) sealing an internal cavity 802 formed by the body 801 and the cover plate combined. The internal cavity 802 is connected to pump system fluid piping (not shown) via the lower opening, providing a system connection to the strainer cross (also not shown). A portion 804 of a non-perforated internal diaphragm 803 within the internal cavity 802 may seal the interface between the body 801 and the cover plate, instead of a separate gasket. A diaphragm stabilizer (not shown) serving the same function described above may be fastened to a metal insert molded within the material of the diaphragm 803.

The views of FIGS. 8A and 8B show the relative position of structures depicted when the bladder 803 contains liquid reactive fluid but before thermal expansion. The diaphragm 803, which may be formed of standard material and have a conventional shape, has a size configured, when the bladder contains an appropriate amount of liquid reactive fluid (and exhibits a corresponding amount of expansion) to leave space between the exterior of the bladder 803 and the interior surface of the body 801 (exaggerated in FIGS. 8A and 8B), to accommodate thermal expansion of the liquid reactive fluid. The views of FIGS. 8C and 8D show the relative position of structures depicted when the bladder 803 contains liquid reactive fluid and after thermal expansion has occurred. As illustrated in FIG. 8E, the gap 808 between the exterior of the bladder 803 and the interior surface of the body 801 may be reduced in size due to thermal expansion.

Various techniques may be used to fill the bladder 803 to a preset volume of liquid reactive fluid (less than maximum volume capacity of the bladder 803), to allow for non-detrimental and nondamaging thermal expansion. This approach could involve pumping a fixed or preset volume from a supply source into the bladder (stopping the pumping either by watching a flow meter or by pumping the supply source dry), or could involve (with the top cover off) pouring a fixed volume into the bladder, then installing and securing the top cover. Alternatively, the liquid reactive fluid may be packaged within individual flexible containers such as balloon(s) that are then inserted into the diaphragm (bladder) 803 through the open top, before the top cover is secured. While a single flexible (or deformable) container (e.g., one balloon) containing the entire quantity of liquid reactive fluid determined to be needed based on the operating pressure(s) and temperature(s) may be used, it may be beneficial to use multiple flexible containers each containing a portion of that determined quantity of liquid reactive fluid, and may further be beneficial to use multiple balloons containing unequal portions. Thus, for example, for an 18 gallon fill, the liquid reactive fluid may be distributed as a set of three 5 gallon flexible containers, two 1 gallon flexible containers, and two ½ gallon flexible containers. The flexible containers, once inserted into the bladder 803, will deform to fit the interior volume of the bladder 803 and the interior shape of the pressure vessel body 801. For any of the foregoing approaches (which may be used for the other embodiments described herein), any air remaining in the internal volume of the bladder 803 may be bled out once the pump pressure is present.

In embodiments where the liquid reactive fluid is poured into the bladder 803 with the top cover removed, fill lines 805, 806 and 807 may be provided as raised ribs or protrusions on the surface of the bladder 803 as shown in FIG. 8A. Different fill lines may correspond to different amounts of thermal expansion (that is, different expected operating temperatures or different operating temperature ranges).

In some embodiments, the size and shape of the interior volume of the body 801 and the size and shape of the molded bladder 803 may be configured for a specific volume or predetermined quantity of liquid reactive fluid (e.g., 20 gallons, or 18 gallons, etc.) used to dampen pressure pulsations in the pumped fluid. In such embodiments, the material of the bladder 803 need not stretch to accommodate the pressure of the predetermined quantity of liquid reactive fluid. This differs from gas-charged pulsation dampeners, in which the bladder normally expands to fill the interior volume of the pressure vessel when gas is inserted to a target operating pressure. The bladder size/shape and the interior volume size/shape leave a gap between the exterior of the bladder 703 and the interior surface of the body 701 to account for thermal expansion of the liquid reactive fluid.

Figure 9A:
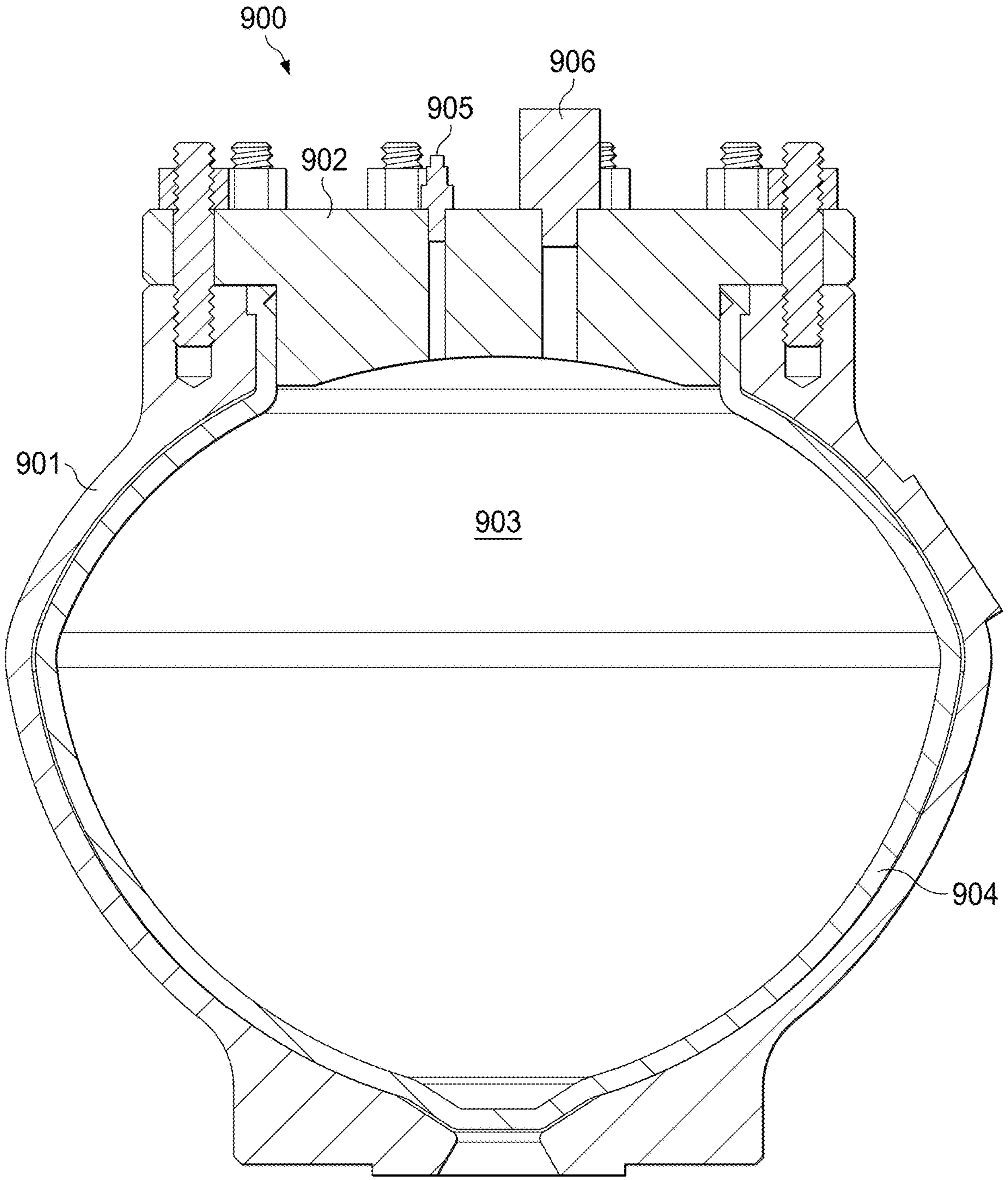
FIG. 9A and FIG. 9B illustrate a liquid reactive fluid dampener relieving pressure from thermal expansion in accordance with embodiments of the present disclosure.
Figure 9B:
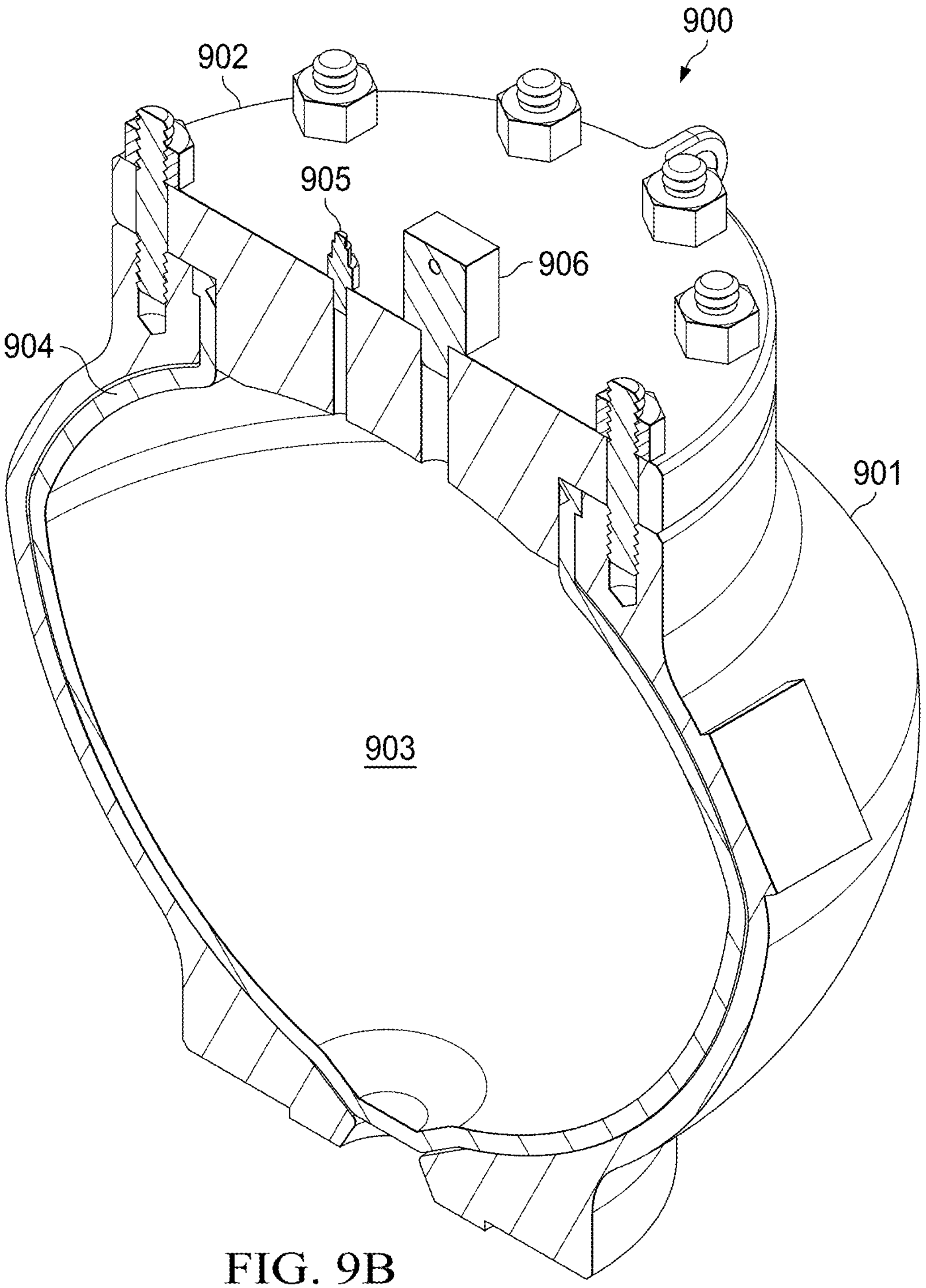

FIG. 9A is a cross-sectional diagram, and FIG. 9B is a corresponding cut-away perspective views, illustrating a liquid reactive fluid dampener relieving pressure from thermal expansion in accordance with embodiments of the present disclosure. Analogous to FIG. 4A, once again, pulsation dampener 900 includes a body 901 having an upper opening receiving and sealed by a cover plate 902, and a lower opening. The cover plate 902 may be bolted to the body 901 as shown, with gasket(s) sealing an internal cavity 903 formed by the body 901 and the cover plate 902. The internal cavity 903 is connected to pump system fluid piping (not shown) via the lower opening, providing a system connection to the strainer cross (also not shown). A portion of a non-perforated internal diaphragm within the internal cavity 903 may seal the interface between the body 901 and the cover plate 902, instead of a separate gasket. A diaphragm stabilizer (not shown) serving the same function described above may be fastened to a metal insert molded within the material of the diaphragm 904.

The embodiment of FIGS. 9A and 9B also includes a fill valve 905 and a reset pressure relief valve 906. In this embodiment, the bladder 904 may be completely filled with liquid reactive fluid, such that the bladder 904 completely expands inside pressure vessel boundaries of the body 901. The reset pressure relief device 906 set to relieve the pressure exceeding a predetermined amount (due to thermal expansion) to avoid any damage and to maintain functionality.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A pulsation dampener, comprising:

a body having an internal cavity, a top opening into the internal cavity, and a bottom opening providing fluid communication between the internal cavity and a fluid flow external to the body;

a flexible diaphragm held within the internal cavity, the flexible diaphragm having a top portion and a bottom portion, the top portion of the flexible diaphragm contacting a region of the body extending downward from the top opening and the bottom portion of the flexible diaphragm separating the internal cavity into a first region of the internal cavity and a second region of the internal cavity, the flexible diaphragm contacting at least some fluid from the external fluid flow that enters the second region of the internal cavity through the bottom opening;

a plurality of fill lines on an internal surface of the top portion of the flexible diaphragm in contact with the sidewalls of the region of the body extending downward from the top opening, each of the fill lines corresponding to a different predetermined quantity of fluid; and liquid reactive fluid within the bottom portion of the flexible diaphragm, in the first region of the internal cavity, and separated by the flexible diaphragm from the at least some fluid from the external fluid flow within the second region of the internal cavity, a quantity of the liquid reactive fluid within the bottom portion of the flexible diaphragm reaching one of the fill lines.

2. The pulsation dampener according to claim 1, further comprising:

a quantity of compressible foam material within the bottom portion of the flexible diaphragm.

3. The pulsation dampener according to claim 2, wherein the compressible foam material forms part of a diaphragm stabilizer.

4. The pulsation dampener according to claim 1, wherein a first of the plurality of fill lines corresponds to 20 gallons of fluid.

5. The pulsation dampener according to claim 1, wherein the pulsation dampener includes a reset pressure relief valve.

6. A method of operating a pulsation dampener, comprising:

connecting a body having an internal cavity, a top opening into the internal cavity, and a bottom opening providing fluid communication between the internal cavity and a fluid flow external to the body;

providing a flexible diaphragm held within the internal cavity, the flexible diaphragm having a top portion and a bottom portion, the top portion of the flexible diaphragm contacting a region of the body extending downward from the top opening and the bottom portion of the flexible diaphragm separating the internal cavity into a first region of the internal cavity and a second region of the internal cavity, the flexible diaphragm contacting at least some fluid from the external fluid flow that enters the second region of the internal cavity through the bottom opening;

providing a plurality of fill lines on an internal surface of the top portion of the flexible diaphragm in contact with the sidewalls of the region of the body extending downward from the top opening, each of the fill lines corresponding to a different predetermined quantity of fluid; and providing a quantity of liquid reactive fluid within the first region of the internal cavity and separated by the flexible diaphragm from the at least some fluid from the external fluid flow within the second region of the internal cavity, the quantity of liquid reactive fluid corresponding to one of the plurality of fill lines.

7. The method according to claim 6, further comprising: providing a quantity of compressible foam material within the bottom portion of the flexible diaphragm.

8. The method according to claim 7, wherein the compressible foam material forms part of a diaphragm stabilizer.

9. The method according to claim 6, wherein the plurality of fill lines comprise a first fill line corresponding to 20 gallons of liquid reactive fluid.

10. The method according to claim 6, wherein the pulsation dampener includes a reset pressure relief valve.

11. A pulsation dampener, comprising:

a body having an internal cavity, a top opening into the internal cavity, and a bottom opening providing fluid communication between the internal cavity and a fluid flow external to the body;

a flexible diaphragm held within the internal cavity, the flexible diaphragm having a top portion and a bottom portion, the top portion of the flexible diaphragm contacting a region of the body extending downward from the top opening and the bottom portion of the flexible diaphragm separating the internal cavity into a first region of the internal cavity and a second region of the internal cavity, the flexible diaphragm contacting at least some fluid from the external fluid flow that enters the second region of the internal cavity through the bottom opening; and a predetermined quantity of liquid reactive fluid within the first region of the internal cavity and separated by the flexible diaphragm from the at least some fluid from the external fluid flow within the internal cavity, the predetermined quantity of liquid reactive fluid corresponding to one of a plurality of fill lines on an internal surface of the top portion of the flexible diaphragm in contact with the sidewalls of the region of the body extending downward from the top opening.

* * * * *